US012481237B2

(12) United States Patent
Miyauchi et al.

(10) Patent No.: US 12,481,237 B2
(45) Date of Patent: Nov. 25, 2025

(54) FIXING MEMBER, METHOD FOR PRODUCING THE SAME, FIXING APPARATUS, AND ELECTROPHOTOGRAPHIC IMAGE FORMING APPARATUS

(71) Applicant: CANON KABUSHIKI KAISHA, Tokyo (JP)

(72) Inventors: Yohei Miyauchi, Tokyo (JP); Masatsugu Toyonori, Kanagawa (JP); Naoko Kasai, Kanagawa (JP); Yasuharu Notoya, Tokyo (JP); Hiroki Muramatsu, Tokyo (JP); Tomoyo Miyakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/543,983

(22) Filed: Dec. 18, 2023

(65) Prior Publication Data

US 2024/0160137 A1 May 16, 2024

Related U.S. Application Data

(63) Continuation of application No. 17/937,735, filed on Oct. 3, 2022, now Pat. No. 11,988,983.

(30) Foreign Application Priority Data

Oct. 4, 2021 (JP) ................................. 2021-163710
Jun. 24, 2022 (JP) ................................. 2022-102217

(51) Int. Cl.
*G03G 15/20* (2006.01)

(52) U.S. Cl.
CPC ................................ *G03G 15/2057* (2013.01)

(58) Field of Classification Search
CPC ........... G03G 15/2057; G03G 15/2053; G03G 2215/2048; G03G 2215/2035
See application file for complete search history.

(56) References Cited

U.S. PATENT DOCUMENTS 5,716,700 A * 2/1998 Kikukawa .......... G03G 15/2057 399/284
10,983,466 B2 * 4/2021 Miyauchi ........... G03G 15/2057
11,644,777 B2 * 5/2023 Ishifuji .............. G03G 15/2064 399/318
11,988,983 B2 * 5/2024 Miyauchi ........... G03G 15/2057
12,001,158 B2 * 6/2024 Kasai ................. G03G 15/2057
2012/0122049 A1 * 5/2012 Kanamori .......... G03G 15/2057 432/92
2015/0355581 A1 * 12/2015 Matsunaka ........ G03G 15/2057 427/444

(Continued)

*Primary Examiner* — Sandra Brase
(74) *Attorney, Agent, or Firm* — Canon U.S.A., Inc. IP Division

(57) ABSTRACT

A fixing member having a base layer and a surface layer, wherein the surface layer includes a tetrafluoroethylene-perfluoroalkyl vinyl ether copolymer, and having at least one pore communicating with an opening on an outer surface thereof. A composition containing perfluoropolyether and a fluoropolymer is contained in at least a part of the at least one pore. The fluoropolymer has a particular repeating unit composed of perfluoropolyether, and at least one structure selected from the group consisting of a T unit of siloxane and a Q unit of siloxane.

12 Claims, 5 Drawing Sheets

(56) References Cited

U.S. PATENT DOCUMENTS

| | | | | |
|---|---|---|---|---|
| 2022/0206419 | A1* | 6/2022 | Muramatsu ........ | G03G 15/2057 |
| 2022/0206421 | A1* | 6/2022 | Miyauchi ........... | G03G 15/2057 |
| 2023/0109438 | A1* | 4/2023 | Kasai ................. | G03G 15/2057 |
| | | | | 399/333 |

* cited by examiner

FIXING MEMBER, METHOD FOR PRODUCING THE SAME, FIXING APPARATUS, AND ELECTROPHOTOGRAPHIC IMAGE FORMING APPARATUS

CROSS-REFERENCE TO RELATED APPLICATION

This application is a continuation of U.S. patent Ser. No. 17/937,735, filed Oct. 3, 2023, which claims the benefit of Japanese Patent Application No. 2021-163710, filed Oct. 4, 2021, and Japanese Patent Application No. 2022-102217, filed Jun. 24, 2022, which are hereby incorporated by reference herein in their entirety.

BACKGROUND

Technical Field

The present disclosure relates to a fixing member, a method for producing the same, a fixing apparatus, and an electrophotographic image forming apparatus.

Description of the Related Art

In a fixing apparatus that is used in an electrophotographic image forming apparatus (hereinafter, also referred to as "image forming apparatus"), rotators are pressed against each other, such as pairs of a heated roller and a roller, a film and a roller, a belt and a roller, and a belt and a belt. These rotators are called fixing members. Then, a recording medium that holds an image formed by an unfixed toner thereon is introduced into a pressure contact part (hereinafter referred to as "fixing nip portion") formed between the rotators, the unfixed toner is heated and melted, and thereby, the image on the recording medium is fixed. The rotator for fixation, with which the unfixed toner image on the recording medium comes in contact, is referred to as a fixing roller, a fixing film, or a fixing belt, according to the form thereof.

In recent years, the diversification of paper media to be used for forming an electrophotographic image has progressed, and it has been required to cope with thin paper having a basis weight of, for example, 52 $g/m^2$. However, rigidity of such thin paper is low, and accordingly, in a conventional fixing member, a toner melted at the time of heat fixation has adhered to a surface of the fixing member (rotator), and the thin paper has been wrapped around the fixing member, in some cases. In order to stably form the electrophotographic image on the thin paper, it is necessary to impart higher toner releasing properties to the surface of the fixing member. Japanese Patent Application Laid-Open No. 2020-140185 discloses a fixing member in which a surface layer contains a fluororesin and a fluorine oil having a perfluoropolyether (hereinafter, also referred to as "PFPE") structure.

According to studies by the present inventors, the fixing member disclosed in Japanese Patent Application Laid-Open No. 2020-140185 shows excellent toner releasing properties over a long period of time. However, in the surface layer of the fixing member according to Japanese Patent Application Laid-Open No. 2020-140185, the fluorine oil exists without causing phase separation with the fluorine resin (refer to paragraph [0019] of Japanese Patent Application Laid-Open No. 2020-140185). In this case, the amount of the fluorine oil is limited which is contained in the surface layer. Accordingly, the present inventors recognized that in order to impart excellent toner releasing properties to the fixing member over a longer period of time, it is necessary to develop a technology directed to providing a fixing member which can retain more PFPE and also stably supply the PFPE to the outer surface.

SUMMARY

At least one aspect of the present disclosure is directed to providing a fixing member that can maintain high toner releasing properties for a longer period of time, and providing a manufacturing method thereof. In addition, another aspect of the present disclosure is directed to providing a fixing apparatus and an electrophotographic image forming apparatus that can stably form a high-quality electrophotographic image over a long period of time.

According to at least one aspect of the present disclosure, there is provided a fixing member having a base layer and a surface layer, the surface layer including a tetrafluoroethylene-perfluoroalkyl vinyl ether copolymer, and having at least one pore communicating with an opening on an outer surface thereof. A composition containing perfluoropolyether and a fluoropolymer is contained in at least a part of the at least one pore. The fluoropolymer has a repeating unit represented by the following structural formula (1), and at least one structure selected from the group consisting of a T unit of siloxane and a Q unit of siloxane;

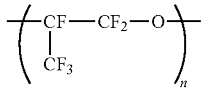

(1)

(in the structural formula (1), n represents a positive integer).

In addition, according to another aspect of the present disclosure, there is provided a method for producing the above fixing member, including the following step (I) to step (V):

step (I): providing a layered product having a base layer and a resin layer containing a tetrafluoroethylene-perfluoroalkyl vinyl ether copolymer (PFA), step (II): bringing a first perfluoropolyether that has been heated to a temperature in the vicinity of a melting point of the PFA into contact with a first surface constituting an outer surface of the resin layer to impregnate the resin layer with the first perfluoropolyether, step (III): cooling to room temperature the layered product obtained in the step (II) in which the resin layer is impregnated with the first perfluoropolyether, step (IV): removing, from the first surface side of the resin layer, at least a part of the first perfluoropolyether impregnated in the resin layer using a fluorine-based solvent to thereby form at least one pore opened on the first surface of the resin layer, in the resin layer, and step (V): allowing at least a part of the at least one pore to contain a mixture containing a second perfluoropolyether and a mixture for forming a fluoropolymer, and curing the mixture for forming the fluoropolymer.

In addition, according to another aspect of the present disclosure, there is provided a fixing apparatus including the above fixing member, and a heating unit for heating the fixing member.

According to further another aspect of the present disclosure, there is provided an electrophotographic image forming apparatus including the above fixing apparatus.

Further features of the present disclosure will become apparent from the following description of exemplary embodiments with reference to the attached drawings.

DESCRIPTION OF THE EMBODIMENTS

Preferred embodiments of the present disclosure will now be described in detail in accordance with the accompanying drawings.

In the present disclosure, the description of "XX or larger and YY or smaller" and "XX to YY", which represent a numerical range, means a numerical range that includes a lower limit and an upper limit which are end points, unless otherwise specified. In addition, in the case where numerical ranges are described in stages, the upper limit and the lower limit of each numerical range can be arbitrarily combined.

The present inventors have intensively studied in order to obtain a fixing member that can maintain excellent toner releasing properties even after a long-term use. As a result, the present inventors have found that the above object can be achieved by the surface layer which includes a tetrafluoroethylene-perfluoroalkyl vinyl ether copolymer (PFA) having a pore communicating with an opening on the outer surface, and contains the composition containing the PFPE and the fluoropolymer described above in at least a part of the pores.

Because the PFA contained in the surface layer has pores leading to the outer surface, the pores can contain the above composition containing the PFPE therein. Because of this, the above fixing member can allow the surface layer to retain more PFPE therein than the surface layer which retains the PFPE in a state in which the PFPE is not phase-separated in the fluororesin, as disclosed in Japanese Patent Application Laid-Open No. 2020-140185.

The present inventors have further studied, and as a result, have found that the composition containing the PFPE and the fluoropolymer described above becomes a gelled composition, and the viscosity thereof is largely improved as compared with that of the PFPE. In other words, in the above composition, the fluidity of the PFPE is largely suppressed. In addition, the above composition has compression resistance, and accordingly the compression of the PFPE is suppressed which originates in the deformation of the surface layer at the time of fixing. Because of this, it can be suppressed that the PFPE excessively migrates to the outer surface at the time of endurance. It is considered that as a result, the fixing member according to the present disclosure can maintain excellent toner releasing properties over a longer period of time than a conventional fixing member.

The fixing member will be described below in detail.

1. Fixing Member

Examples of the fixing member include a fixing roller, a fixing film, and a fixing belt. The fixing member has a base layer and a surface layer. An elastic layer containing silicone rubber may be provided between the base layer and the surface layer.

Figure 1A:
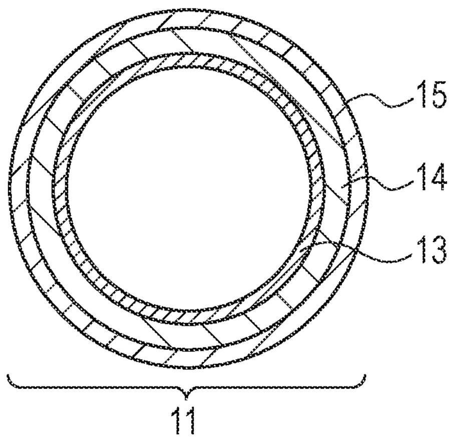
FIG. 1A and FIG. 1B illustrate schematic cross-sectional views of a fixing belt (A) and a fixing roller (B) according to one embodiment of the present disclosure.
Figure 1B:
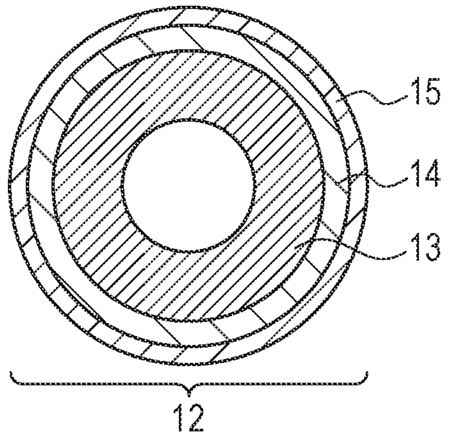

FIG. 1A and FIG. 1B are schematic cross-sectional views illustrating different embodiments of the fixing member according to the present disclosure. FIG. 1A illustrates a fixing member having an endless belt shape (hereinafter also referred to as "fixing belt 11"), and FIG. 1B illustrates a fixing member having a roller shape (hereinafter also referred to as "fixing roller 12").

The fixing members according to FIG. 1A and FIG. 1B include a base layer 13, an elastic layer 14 that covers an outer surface thereof, and a surface layer 15 that covers a surface of the elastic layer opposite to a side facing the base layer. For information, the surface layer 15 may be bonded to the surface of the elastic layer 14 opposite to the side facing the base layer, by an unillustrated adhesive layer.

(1) Base Layer

A material of the base layer 13 is not particularly limited, and a known material can be adopted which is used as a base layer of the fixing member. For example, there can be used metals and alloys such as aluminum, iron, stainless steel and nickel, and heat-resistant resins such as polyimide.

In the fixing belt 11, a base material having an endless belt shape may be used as the base layer 13. Examples of the material of the base layer 13 in this case include materials having excellent heat resistance such as nickel, stainless steel and polyimide. The thickness of the base layer 13 is not particularly limited, and is preferably 20 μm or larger and 100 μm or smaller from the viewpoint of strength, flexibility and heat capacity, for example.

In the fixing roller 12, a solid or hollow core metal, for example, is used as the base layer 13. Materials of the core metal include metals and alloys such as aluminum, iron, and stainless steel. When the hollow core metal is used, a heat source can be provided in the inside.

The outer surface of the base layer 13 may be subjected to surface treatment in order to impart adhesiveness to the elastic layer 14. As the surface treatment, one treatment or a combination of a plurality of treatments can be used which are physical treatments such as blast treatment, lap treatment and polishing, and chemical treatments such as oxidation treatment, coupling agent treatment and primer treatment.

When the elastic layer 14 containing silicone rubber is provided on the surface of the base layer 13, it is preferable to subject the surface of the base layer 13 to primer treatment, in order to improve adhesiveness between the base layer 13 and the elastic layer 14. Examples of a primer to be used for the primer treatment include a paint in which such substances are appropriately blended and dispersed in an organic solvent, as a silane coupling agent, a silicone polymer, a hydrogenated methyl siloxane, an alkoxysilane, a reaction promoter catalyst, and a coloring agent such as bengara.

The primer can be appropriately selected according to the material of the base layer 13, a type of the elastic layer 14, or the form of a cross-linking reaction. In particular, when the elastic layer 14 contains a large amount of unsaturated aliphatic groups, a primer containing a hydrosilyl group is preferably used, so as to impart adhesiveness to the elastic layer by reaction with the unsaturated aliphatic groups. In addition, when the elastic layer 14 contains a large amount of hydrosilyl groups, a primer containing an unsaturated aliphatic group is preferably used. Examples of other types of primers include primers containing alkoxy groups. As the primer, a commercially available product can be used. In addition, the primer treatment includes a step of applying a primer to the outer surface (surface to be bonded with elastic layer 14) of the base layer 13, and drying or baking the primer.

(2) Elastic Layer

Materials of the elastic layer 14 are not particularly limited, and a known material can be adopted which is used as an elastic layer of the fixing member. It is preferable to allow the elastic layer 14 to contain silicone rubber excellent in heat resistance. As a raw material of the silicone rubber, an addition curing type of liquid silicone rubber is preferably used. When the elastic layer contains a silicone rubber having poor chemical affinity with the PFPE, it is difficult for the PFPE contained in the surface layer to migrate to the elastic layer even in long-term use, and the PFPE is supplied only to the surface of the fixing member, which are advantageous.

The thickness of the elastic layer 14 can be appropriately designed in consideration of the surface hardness of the fixing member and the width of the fixing nip portion to be formed. When the fixing member is the fixing belt 11, the thickness of the elastic layer 14 is preferably 100 μm or larger and 500 μm or smaller, and more preferably 200 μm or larger and 400 μm or smaller. In addition, when the fixing member is the fixing roller 12, the thickness of the elastic layer 14 is preferably 0.1 mm (100 μm) or larger and 3.0 mm or smaller, and more preferably 0.3 mm (300 μm) or larger and 2.0 mm or smaller. When the thickness of the elastic layer 14 is set to this range, a sufficient width of the fixing nip portion can be ensured, when the fixing member is incorporated in the fixing apparatus.

The elastic layer 14 may include a filler. The filler is added thereto in order to control thermal conductivity, heat resistance and elastic modulus. Specific examples of the filler include silicon carbide (SiC), silicon nitride ($Si_3N_4$), silica ($SiO_2$), boron nitride (BN), aluminum nitride (AlN), alumina ($Al_2O_3$), iron oxide ($Fe_2O_3$), zinc oxide (ZnO), magnesium oxide (MgO), titanium oxide ($TiO_2$), copper (Cu), aluminum (Al), silver (Ag), iron (Fe), nickel (Ni), carbon black (C), carbon fiber (C), and carbon nanotube (C).

(3) Surface Layer

The surface layer 15 contains a tetrafluoroethylene-perfluoroalkyl vinyl ether copolymer (PFA). Furthermore, the surface layer 15 has at least one pore 3. The at least one pore includes one pore or a plurality of pores. That is, the surface layer has one pore or a plurality of pores. Hereinafter, the at least one pore may be referred to as “a pore(s)”. A composition containing perfluoropolyether (PFPE) and the fluoropolymer described above is contained in at least a part of the at least one pore which the PFA has. As illustrated in FIG. 2B, the surface layer has the pore(s) 3 which is opened on a first surface 101 constituting the outer surface of the fixing member. For information, the outer surface of the fixing member is defined as a surface that comes in contact with the unfixed toner on the recording medium at the time of fixing. Here, it is preferable that the pore 3 does not have a shell. In other words, it is preferable that the wall of the pore(s) 3 is composed of a solid portion of the surface layer, specifically, the resin portion 1 containing the PFA. At least a part of the pore(s) 3 contains a composition 4 containing perfluoropolyether (PFPE) and a fluoropolymer. As is illustrated in FIG. 2C, the pore(s) 3 are filled, for example, with the composition 4 containing the PFPE and the fluoropolymer.

When an aperture ratio of the first surface of the surface layer is defined as P1, the P1 is preferably 1.0% or larger, more preferably 1.5% or larger, and further preferably 3.0% or larger. In addition, the P1 is preferably 15.0% or smaller, and more preferably 10.0% or smaller. When the P1 is 1.0% or larger, migration of the PFPE in the pore(s) to the first surface of the surface layer resists being hindered, and more stable toner releasing properties can be imparted to the first surface. In addition, when the P1 is 15.0% or smaller, excessive migration of the PFPE in the pore(s) to the first surface can be suppressed, which contributes to stable maintenance of the toner releasing properties over a longer period of time.

In the case where the fixing member is a fixing member having an endless belt shape, when a ratio (%) of an area P22 occupied by the pore(s) to an area P21 including the entire thickness portion of the surface layer (including pore portion) in the cross section of the surface layer along the circumferential direction of the fixing member (=(P22/P21)×100, and hereinafter, also referred to as “porosity”) is defined as P2, the P2 is preferably 25.0% or larger, and more preferably 30.0% or larger. In addition, the upper limit of the P2 is not particularly limited, and is preferably 60.0% or lower, and more preferably 50.0% or lower. When the P2 is 25.0% or larger, the surface layer can retain a larger amount of the PFPE therein. As a result, stable toner releasing properties can be imparted to the first surface over a longer period of time. On the other hand, when the P2 is 60.0% or smaller, the progress of abrasion due to an excessive number of pore(s) in the surface layer can be more satisfactorily prevented. For information, the porosity can be calculated from a cross section along the circumferential direction of the fixing member, of the surface layer from which second PFPE has been removed that is contained in the pore(s) of the surface layer of the fixing belt according to the present disclosure, or of the resin layer from which the first PFPE has been removed that is obtained after the pore forming step which will be described later.

The average opening diameter of the openings on the first surface of the surface layer is preferably 1 nm or larger and 5 μm or smaller, and more preferably 50 nm or larger and 1 μm or smaller. When the average opening diameter is 1 nm or larger, the PFPE existing in the pore(s) can be more reliably migrated to the first surface of the surface layer, and excellent toner releasing properties can be more reliably imparted to the outer surface of the fixing member. On the other hand, when the average opening diameter is 5 μm or smaller, the toner particles adhering to the outer surface of the fixing member can be prevented from entering the pore(s), and hindering of the supply of the PFPE to the first surface can be prevented more reliably.

The thickness of the surface layer is preferably 10 μm or larger and 100 μm or smaller, and more preferably 15 μm or larger and 85 μm or smaller.

<PFA>

The PFA contained in the surface layer will be described below in detail.

The PFA is a copolymer of perfluoroalkyl vinyl ether (hereinafter referred to as “PAVE”) and tetrafluoroethylene (hereinafter referred to as “TFE”). The number of carbon atoms of the perfluoroalkyl chain in the PAVE is preferably 1 to 6, more preferably 1 to 4, and further preferably 1 to 3. The PAVE is preferably selected from perfluoromethyl vinyl ether ($CF_2{=}CF{-}O{-}CF_3$), perfluoroethyl vinyl ether ($CF_2{=}CF{-}O{-}CF_2CF_3$), and perfluoropropyl vinyl ether ($CF_2{=}CF{-}O{-}CF_2CF_2CF_3$).

A melting point of the PFA is preferably 280° C. to 320° C., and more preferably 290° C. to 310° C.

As the PFA, commercially available PFA can be used, and specific examples thereof include the following:

"451HP-J", "959HP-Plus", "350-J" and "950HP-Plus" (all trade names, produced by Chemours-Mitsui Fluoroproducts Co., Ltd.);

"P-66P", "P-66PT" and "P-802UP" (all trade names, produced by AGC Inc.);

"AP-230", "AP-231SH" and the like (all trade names, produced by Daikin Industries, Ltd.); and "6502N" (trade name, produced by 3M Japan Limited).

<Perfluoropolyether (PFPE)>

The PFPE contained in at least a part of the pore(s) will be described below in detail. The PFPE which is contained in the composition contained in the pore(s) is referred to as "second PFPE" in some cases, so as to be distinguished from the PFPE (first PFPE) that is used at the time of forming a surface layer having pore(s), which will be described later.

The second PFPE contained in the pore(s) is not particularly limited, and known PFPE can be adopted. The second PFPE preferably has a structure common to a repeating unit represented by the following structural formula (1) contained in the fluoropolymer, as will be described later. Specifically, as the second PFPE, PFPE having a structure represented by the following structural formula (2) is preferable. In addition, the second PFPE is preferably PFPE which becomes oily at the melting point of the PFA contained in the surface layer.

(2)

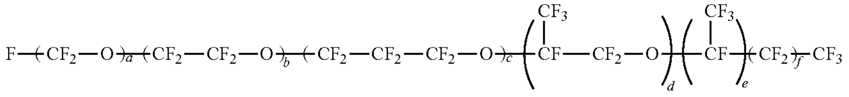

In the structural formula (2), a, b, c, d, e and f each independently represent 0 or a positive integer, and satisfy $1 \leq a+b+c+d+e+f \leq 600$; and at least one of a, b, c and d is a positive integer. In addition, the order of existence of each repeating unit in the structural formula (2) is not limited to the above order. Furthermore, a plurality of repeating units in the structural formula (2) may exist at a plurality of positions in the PFPE. In other words, the PFPE having the structure represented by the structural formula (2) may be a block copolymer or a random copolymer, when being a copolymer.

Examples of commercially available second PFPE include the following: PFPE having a structure represented by the following structural formula (3) (for example, Demnum S-200 and Demnum S-65 (both trade names), produced by Daikin Industries, Ltd.); PFPE having a structure represented by the following structural formula (4) (for example, Krytox XHT-1000, Krytox VPF-16256, Krytox GPL-107, Krytox GPL-106, Krytox GPL-105, Krytox GPL-104, Krytox GPL-103, Krytox GPL-102, and Krytox GPL-101 (all trade names), produced by Chemours Co., Ltd.); PFPE having a structure represented by the following structural formula (5) (for example, Fomblin M60, Fomblin M100, and Fomblin Z25 (all trade names), produced by Solvay Specialty Polymers); and PFPE having a structure represented by the following structural formula (6) (for example, Fomblin Y45 and Fomblin Y25 (both trade names), produced by Solvay Specialty Polymers).

(3)

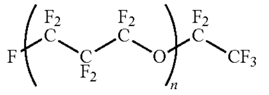

(In the structural formula (3), n represents a positive integer, and n is a number in a range in which the viscosity of the PFPE at a temperature of 40° C. is in a range of 30 mPa·s to 500 mPa·s.)

(4)

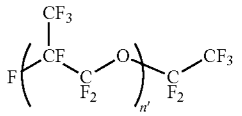

(In the structural formula (4), n' represents a positive integer, and n' is a number in a range in which the viscosity of the PFPE at a temperature of 40° C. is in a range of 10 mPa·s to 2500 mPa·s.)

(5)

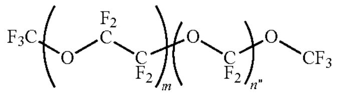

(In the structural formula (5), m and n" each independently represent a positive integer, m/n" is a number of 0.5 or larger and 2 or smaller, and m+n" is a number in a range in which the viscosity of the PFPE at a temperature of 40° C. is in a range of 20 mPa·s to 1400 mPa·s.)

(6)

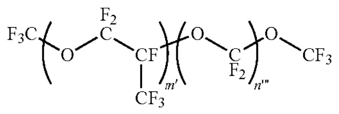

(In the structural formula (6), m' and n"' each independently represent a positive integer, m'/n"' represents a number of 20 or larger and 1000 or smaller, and m'+n"' is a number in a range in which the viscosity of the PFPE at a temperature of 40° C. is in a range of 20 mPa·s to 1200 mPa·s.)

It is more preferable that the second PFPE has at least one structure selected from the group consisting of the above structural formulae (3) to (6). In particular, from the viewpoint of compatibility with the fluoropolymer, which will be described later, it is preferable that the second PFPE is a PFPE which has a structure represented by the above structural formula (4).

The viscosity of the second PFPE contained in the pore(s) at a temperature of 40° C. is preferably 500 mPa·s or higher and 2500 mPa·s or lower, and more preferably 1000 mPa·s or higher and 2000 mPa·s or lower. PFPE having such a viscosity range contributes to stable migration from the pore(s) to the first surface of the surface layer. The viscosity as referred to herein is a value that is measured by a cone-plate type dynamic viscoelasticity measuring apparatus (rheometer) in which a cone-plate having a cone angle of 1 degree and a cone radius of 20 mm is used, when rotated at a measurement temperature of 40° C. and a shear rate of 100 $s^{-1}$ for 60 seconds.

Examples of commercially available PFPE that can be used as the second PFPE include: "Krytox GPL-105" (viscosity 301 mPa·s), "Krytox GPL-106" (viscosity 459 mPa·s), "Krytox GPL-107" (viscosity 852 mPa·s), "Krytox VPF-16256" (viscosity 1403 mPa·s), and "Krytox XHT-1000" (viscosity 1941 mPa·s) (all trade names, produced by Chemours Co., Ltd.); and "Fomblin M60" (viscosity 586 mPa·s) and "Fomblin M100" (viscosity 1327 mPa·s) (both trade names, produced by Solvay Specialty Polymers).

The content ratio of the second PFPE in the surface layer is preferably 5% by mass or more, and more preferably 15% by mass or more, on the basis of the total mass of the surface layer including the mass of the composition containing the second PFPE and the fluoropolymer in the pore(s). The upper limit of the content ratio is preferably 55% by mass or less, and more preferably 30% by mass or less. When the content ratio is 5% by mass or more, the toner releasing properties are satisfactorily maintained over a longer period of time. In addition, when the content ratio is 55% by mass or less, abrasion due to use of the surface layer can be more reliably prevented.

For information, the content ratio of the second PFPE in the surface layer can be calculated from the content ratio of the composition containing the second PFPE and the fluoropolymer in the surface layer, which will be described later, and the content ratio of the second PFPE in the composition, which will be described later.

<Fluoropolymer>

The fluoropolymer contained in at least a part of the pore(s) will be described below in detail.

The fluoropolymer in the present disclosure has a repeating unit represented by the following structural formula (1), and further has at least one structure of a T unit and a Q unit of siloxane. The structure represented by the structural formula (1) is common to the perfluoroalkyl ether structure of PFPE. Because of this, the fluoropolymer having the structure represented by the structural formula (1) has high affinity with PFPE. Here, the T unit of siloxane represents a trifunctional basic unit ($RSiO_{3/2}$) in which one organic substituent R is bonded to a silicon atom, and the Q unit of siloxane represents a tetrafunctional basic unit ($SiO_{4/2}$) in which any one of organic substituents R is not bonded to a silicon atom. Examples of the organic substituent R include alkyl groups such as a methyl group; aryl groups such as a phenyl group; alkoxy groups such as a methoxy group; and alkenyl groups such as a vinyl group and an allyl group. In addition, the fluoropolymer having at least one selected from the T unit and the Q unit of the siloxane can stably have a gel form, by having a three-dimensional structure of polysiloxane. Because of this, the fluoropolymer can cause the PFPE to exist in the pore(s) as a gelled composition, due to high affinity with the PFPE caused by the structural portion represented by the structural formula (1).

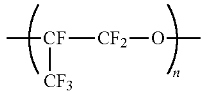

(1)

In the structural formula (1), n represents a positive integer.

A fluoropolymer that has at least one selected from the T unit and the Q unit of siloxane as well as a structure represented by the structural formula (1) can be obtained by using a mixture for forming the fluoropolymer, which contains, for example, a compound having the structure represented by the structural formula (1) and having an unsaturated aliphatic group which is bonded to a silicon atom ($—Si—CH_2═CH_2$), a crosslinking agent having a hydrosilyl group (—Si—H), and a catalyst such as platinum; and subjecting the unsaturated aliphatic group and the hydrosilyl group to an addition reaction (hydrosilylation reaction). In addition, the fluoropolymer can also be obtained by subjecting an alkoxysilyl group of a compound having a structure represented by the structural formula (1) and having the alkoxysilyl group to dehydration condensation. In the present disclosure, it is preferable to form the fluoropolymer by the above hydrosilylation reaction, from the viewpoint of suppressing the production of by-products and easily controlling the reaction.

The above mixture for forming the fluoropolymer will be described below in detail, which can be used for forming the fluoropolymer according to the present disclosure, by the hydrosilylation reaction. Examples of the compound having a structure represented by the structural formula (1) and having an unsaturated aliphatic group bonded to a silicon atom, which is contained in the mixture for forming the fluoropolymer, include compounds represented by the following structural formula (7).

The viscosity of the compound is not particularly limited, but it is preferable that the viscosity at a temperature of 23° C. is, for example, 0.50 Pa·s to 40.0 Pa·s, from the viewpoint of ensuring satisfactory fluidity of the mixture, when the pore(s) of the surface layer are filled with the mixture of the second PFPE and the mixture for forming the fluoropolymer. The viscosity as referred to herein is a value that is measured by a dynamic viscoelasticity measuring apparatus (rheometer) using a cone-plate model having a cone angle of 1 degree and a cone radius of 20 mm, when rotated at a measurement temperature of 23° C. and a shear rate of 100 $s^{-1}$ for 60 seconds.

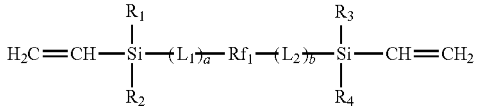

(7)

In the above structural formula (7), $R_1$ to $R_4$ each independently represent any one of —H, $—CH_3$ and $—CH═CH_2$; and $L_1$ and $L_2$ each independently represent an alkylene group having 1 to 4 carbon atoms, or $—Y—NR_5—CO—$ (where Y represents an alkylene group having 1 to 4 carbon atoms or any one of an o-, m-, or p-phenylene group represented by the following structural formula (I), and $R_5$ represents any one of —H, $—CH_3$, and $—C_6H_5$). In addition, a and b each independently represent 0 or 1. $Rf_1$ represents a structure represented by the following structural formula (II).

(i)

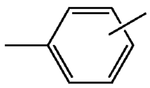

(ii)

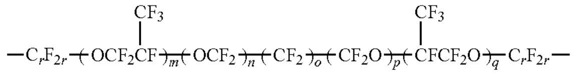

In the structural formula (II), m and q each independently represent an integer of 0 or 1 to 150, and m+q is 2 to 200. Each of n and p independently represents an integer of 1 to 3, o represents an integer of 0 or 1 to 6, and r represents 2 or 3.

Next, examples of the crosslinking agent contained in the above mixture for forming the fluoropolymer include: a fluorine-containing organosilicon compound represented by the following structural formula (8), which can form a structure of the T unit of siloxane; and an organosilicon compound represented by the structural formula (9), which can form a structure of the Q unit of siloxane. The fluorine-containing organosilicon compound represented by the structural formula (8) is added to the compound represented by the above structural formula (7) through a hydrosilylation reaction, and thereby a fluoropolymer having a structure selected from a T unit of siloxane is formed. In addition, the organosilicon compound represented by the structural formula (9) is added to the compound represented by the above structural formula (7) through a hydrosilylation reaction, and thereby a fluoropolymer having a structure of a Q unit of siloxane is formed. Then, the fluoropolymer according to the present disclosure results in having a three-dimensional crosslinked structure, by having a polysiloxane structure of the T unit or the Q unit. Because of this, it is considered that when the compound represented by the structural formula (7) in the mixed (dissolved) substance of liquid PFPE and the mixture for forming the fluoropolymer is reacted with the crosslinking agent, the liquid PFPE is taken into the polysiloxane structure of the T unit or the Q unit, and becomes gelled.

(8)

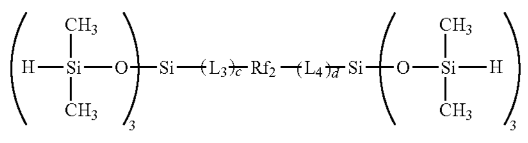

-continued (9)

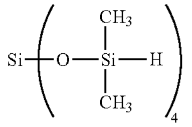

In the above structural formula (8), $L_3$ and $L_4$ each independently represent an alkylene group having 1 to 4 carbon atoms, or —Y—$NR_5$—CO— (where Y represents an alkylene group having 1 to 4 carbon atoms or any one of an o-, m-, or p-phenylene group represented by the above structural formula (I), and $R_5$ represents any one of —H, —$CH_3$, and —$C_6H_5$). In addition, c and d each independently represent 0 or 1. $Rf_2$ represents a structure represented by the above structural formula (II), or a perfluoroalkylene group having 1 to 20 carbon atoms.

Furthermore, as the catalyst contained in the mixture for forming the fluoropolymer, known catalysts can be used which are used in the hydrosilylation reaction. Specific examples thereof include platinum catalysts such as chloroplatinic acid, alcohol-modified chloroplatinic acid, and complexes of chloroplatinic acid and olefin.

A heating temperature and a heating time period at the time when the mixture for forming the fluoropolymer is cured (hydrosilylation) can be selected according to a desired reaction rate. For example, the heating temperature is preferably in a range of 100° C. to 250° C., and particularly 150° C. to 200° C.; and the heating time period is preferably in a range of 60 seconds to 4 hours.

As the above mixture for forming the fluoropolymer, a commercially available mixture can also be used. Examples of commercially available products of the mixture for forming the fluoropolymer are shown below, which contains a compound having a vinyl group bonded to a silicon atom, which is represented by the following structural formula (7-1), a crosslinking agent which is represented by the above structural formula (8), and a platinum catalyst.

Liquid fluoroelastomers "SIFEL X-71-359" and "SIFEL8070A/B" (both trade names, produced by Shin-Etsu Chemical Co., Ltd.)

"SF5000" and "SF7000" (both trade names, produced by Fujikura Composites Inc.)

(7-1)

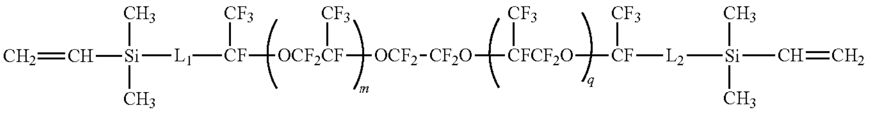

For information, as a commercially available product of the mixture for forming the fluoropolymer according to the present disclosure, any one of a one-part type and a two-part type can be used. In addition, a filler may be added to the mixture for forming the fluoropolymer according to the present disclosure, in such an extent that the filler can be introduced into the pore(s) of the surface layer together with the second PFPE. Examples of the fillers include silica, carbon powder, and metal oxides (for example, titanium oxide, aluminum oxide and the like).

A content ratio of the fluoropolymer in the surface layer is preferably 5% by mass or more and 55% by mass or less, with respect to the total mass of the surface layer, which includes the mass of the composition containing the second PFPE and the fluoropolymer in the pore(s), and more preferably 15% by mass or more and 30% by mass or less. When the content ratio is 5% by mass or more, the toner releasing properties are satisfactorily maintained in a further longer period of use. In addition, when the content ratio is 55% by mass or less, abrasion of the surface layer due to use can be more reliably prevented.

A fixing member according to the present disclosure includes a composition of the above second PFPE and the above fluoropolymer in at least a part of the pore(s) in the surface layer.

When only PFPE is contained in the pore(s), the migration of the PFPE in the surface layer to the first surface of the surface layer proceeds relatively quickly. On the other hand, in the fixing member according to the present disclosure, the second PFPE is considered to exist in the pore(s) in a gelled state by being incorporated in the three-dimensional cross-linked structure of the polysiloxane composed of the T unit and the Q unit of the fluoropolymer. Because of this, excessive migration of the PFPE to the first surface of the surface layer is suppressed, even when the surface layer of the fixing member is deformed in the fixing step. As a result, the second PFPE contained in the surface layer resists being depleted at an early stage, and stable toner releasing properties can be continuously imparted to the first surface of the surface layer over a longer period of time.

As described above, it is considered that the second PFPE in the pore(s) of the surface layer is retained in the network structure formed by three-dimensional crosslinking of the fluoropolymer, and exists as the gelled composition. In order to stably retain the second PFPE in the three-dimensionally crosslinked structure of the fluoropolymer, the second PFPE preferably has a chemical structure common to that of the fluoropolymer. Also, from this point of view, as the second PFPE, PFPE having a structure represented by the structural formula (4) is particularly preferable, which has the same structure as the structure represented by the structural formula (1) of the fluoropolymer.

The content ratio (mass ratio) of the second PFPE in the composition, in other words, (mass of second PFPE/(total mass of second PFPE and fluoropolymer)) is preferably 0.20 or more and 0.80 or less, and more preferably 0.40 or more and 0.60 or less. When the mass ratio is 0.20 or more, retainability by the fluoropolymer does not become excessively strong, and the migration of the PFPE to the first surface is performed smoothly. In addition, when the mass ratio is 0.80 or less, the cross-linking reaction of the fluoropolymer is not hindered, and excessive surface migration of the PFPE can be suppressed while the retainability of the fluoropolymer is maintained.

The content ratio is calculated in the following way. As will be described later, the content ratio (% by mass) of the above composition with respect to the total mass of the surface layer is calculated by thermogravimetric measurement. In addition, by the surface layer being immersed in a fluorine-based solvent, only the second PFPE is extracted, and the content ratio of the second PFPE can be measured. Then, the content ratio (mass ratio) of the second PFPE in the above composition can be calculated from the content ratio (% by mass) of the second PFPE/content ratio (% by mass) of the above composition.

It is preferable for the content ratio of the composition containing the second PFPE and the fluoropolymer in the pore(s) to the total mass of the surface layer including the mass of the composition to be 20% by mass or more and 60% by mass or less, and is more preferable to be 30% by mass or more and 50% by mass or less. When the content ratio of the above composition is 20% by mass or more, the migration of the PFPE to the first surface of the surface layer resists being hindered, and more stable toner releasing properties can be imparted to the first surface. In addition, when the content ratio of the above composition is 60% by mass or less, the abrasion of the surface layer can be more satisfactorily prevented.

The mixture of the second PFPE and the mixture for forming the fluoropolymer has fluidity, and accordingly can be easily introduced into the pore(s) in the resin constituting the surface layer. In the present disclosure, PFA having high chemical affinity with the fluoropolymer or the PFPE is used as the resin, and accordingly, it is easy to introduce the above mixture over the whole region in the film thickness direction of the PFA.

The solubility parameter difference (ΔHSP) between the mixture containing the second PFPE and the mixture for forming the fluoropolymer and the PFA constituting the surface layer is preferably 10.0 $(MPa)^{0.5}$ or smaller, and more preferably 7.0 $(MPa)^{0.5}$ or smaller. When the solubility parameter difference is 10.0 $(MPa)^{0.5}$ or smaller, the mixture can be smoothly introduced into the pore(s).

The solubility parameter (SP value) is a parameter expressed by a square root of molecular cohesive energy, and serves as a measure of affinity among two or more types of substances. In the present disclosure, the SP value is derived with the use of Hansen's method. Here, the Hansen's method represents energy of one substance by three components of a dispersion energy term (δD), a polarization energy term (δP), and a hydrogen bonding energy term (δH), and represents the energy as a vector in a three-dimensional space. For example, in the case where the difference (ΔHSP) between the SP values of the two types of substances is small (the distance between the two types of substances is short), the case means that the two types of substances have high solubility to each other, in other words, are easily miscible. On the other hand, in the case where the difference between the SP values of the two types of substances is large (the distance between the two types of substances is long), the case means that the two types of substances have low solubility to each other, in other words, resist mingling.

The terms of δD, δP and δH can be calculated with the use of 3rd Edition 3.1.14 of the calculation software "HSPiP (trade name)" provided with a database, which the Hansen group develops and sells. At this time, the SP value of each component is calculated on the basis of the following equation (a).

$$\text{SP value}=(\delta D^2+\delta P^2+\delta H^2)^{0.5} \quad (a)$$

In addition, the difference (ΔHSP) between solubility parameters of two types of components shall be defined by a distance in the above three-dimensional space, and the value is calculated on the basis of the following equation (b). Note that δD1 and δD2 represent the dispersion energy terms of the respective components, δP1 and δP2 represent the polarization energy terms of the respective components, and δH1 and δH2 represent the hydrogen bonding energy terms of the respective components.

$$\Delta HSP=[4(\delta D1-\delta D2)^2+(\delta P1-\delta P2)^2+(\delta H1-\delta H2)^2]^{0.5} \quad (b)$$

Here, when the mixture for forming the fluoropolymer includes a compound having a structure represented by the structural formula (7), a substantial structural difference between the compound and the second PFPE is only in a point that unsaturated aliphatic groups are bonded to both ends of the compound. Because of this, the SP values of the compound and the second PFPE become substantially the same, which are obtained by the above method. In addition, in the mixture for forming the fluoropolymer, the compound is a main component, and accordingly, as an SP value of the mixture which contains the mixture for forming the fluoropolymer and the second PFPE, the SP value of the compound or the SP value of the second PFPE can be used.

<Method for Producing Fixing Member>

Examples of a non-limiting method of producing a fixing member according to one embodiment of the present disclosure include a method including the following steps (I) to (V). For information, the elastic layer to be formed on the outer peripheral surface of the base layer can be provided as needed.

Step (I): providing a layered product having a base layer having an endless belt shape or a roller shape, the elastic layer on an outer peripheral surface of the base layer, and a resin layer on an outer peripheral surface of the elastic layer, which contains PFA, step (II): bringing a first perfluoropolyether (first PFPE) that has been heated to a temperature in the vicinity of a melting point of PFA into contact with a surface (first surface) of the resin layer opposite to a side facing the elastic layer to impregnate the resin layer with the first PFPE, step (III): cooling to room temperature the layered product obtained in the step (II) in which the resin layer is impregnated with the first PFPE, step (IV): removing, from the first surface side of the resin layer, at least a part of the first PFPE impregnated in the resin layer using a fluorine-based solvent to thereby form pore(s) opened on the first surface of the resin layer, in the resin layer, and step (V): allowing at least a part of the pore(s) to contain a mixture containing a second PFPE and a mixture for forming a fluoropolymer, and curing the mixture for forming the fluoropolymer.

Thereby, a fixing member is obtained that has a surface layer according to the present disclosure, which is the resin layer, and contains a composition containing the second PFPE and a fluoropolymer, in at least a part of the pore(s).

The present inventors assume a mechanism by which the fixing member according to one embodiment of the present disclosure is formed by the above method, in the following way.

In the step (II), the first surface of the resin layer is brought into contact with the first PFPE, at a temperature (300° C.±50° C., preferably 290° C. to 325° C.) in the vicinity of the melting point of the PFA contained in the resin layer, and thereby the resin layer is impregnated with the first PFPE.

Next, in the step (III), the resin layer is cooled to room temperature (for example, 20° C. to 35° C., preferably 25° C.). For information, the step (III) may be performed in a state in which the resin layer is in contact with the PFPE, for example, in a PFPE bath, or may be performed after removal from the PFPE bath. However, when the resin layer is cooled after the resin layer has been taken out from the high-temperature PFPE bath, the first surface side of the resin layer shrinks along with the cooling, and the first PFPE impregnated in the vicinity of the first surface side of the resin layer is released to the outside, in some cases. The release of the first PFPE to the outside of the resin layer due to the shrinkage of the resin layer tends to easily occur, particularly when the viscosity of the first PFPE is low. As a result, a region occupied by the first PFPE with which the resin layer is impregnated decreases. Accordingly, in the step (IV) which will be described later, the volume of the pore(s) which are formed by the removal of the first PFPE in the resin layer relatively decreases. Because of this, when a PFPE having a low viscosity is used as the first PFPE, it is preferable that the resin layer is removed from the first PFPE bath, after the temperature of the PFPE bath is cooled to at least the melting point (specifically, 296° C., for example) of the PFA or lower, preferably to 250° C. or lower, and more preferably to room temperature. Thereby, the shrinkage of the resin layer can be prevented, which occurs when the layered product has been taken out from the PFPE bath.

Next, in the step (IV), the first PFPE is removed from the resin layer by use of a fluorine-based solvent, thereby pore(s) are formed which are opened on the first surface of the resin layer, at sites at which the first PFPE has existed. For information, in the step (IV), almost all of the impregnated first PFPE can be eluted from the resin layer. Pore(s) to be formed inside the resin layer can be increased by the increase of the amount of the first PFPE impregnated into the resin layer.

In the step (II), the first PFPE is impregnated so that the content ratio of the first PFPE to the total mass of the resin layer impregnated with the first PFPE becomes preferably 25% by mass to 60% by mass, and more preferably 30% by mass to 55% by mass. When the content ratio of the first PFPE is 25% by mass or more, the PFPEs are easily agglomerated with each other, and pore(s) become easily formed. In addition, when the content ratio of the first PFPE is 60% by mass or less, a decrease in a mechanical strength due to an increase in the porosity can be suppressed.

Here, the content ratio of the first PFPE is defined as a ratio (% by mass) of the mass of the first PFPE impregnated in the resin layer, to the sum of the mass of the resin layer itself before the resin layer is impregnated with the first PFPE and the mass of the first PFPE impregnated in the resin layer. Specifically, when the total mass of the resin layer impregnated with the first PFPE is defined as X, and the total mass of the resin layer before the resin layer is impregnated with the first PFPE is defined as Y, the content ratio (impregnation ratio) Z of the first PFPE with respect to the total mass of the resin layer is calculated by the following equation:

$$Z\ (\%\ \text{by mass})=[(X-Y)/X]\times 100.$$

For information, the content ratio of the first PFPE can be calculated with the use of a thermogravimetric analyzer, as will be described in Examples.

The amount of the first PFPE impregnated into the resin layer can be adjusted by, for example, a temperature of the first PFPE at the time of impregnation, a viscosity of the first PFPE, and a contact time period between the resin layer and the first PFPE. Specifically, as the temperature is higher within a temperature range (250° C. to 350° C.) in the vicinity of the melting point of PFA, as the viscosity of the first PFPE is lower, or as the contact time period with the resin layer is longer, the amount of the first PFPE impregnated into the resin layer can be increased. For information, as described above, when the first PFPE having a low viscosity is used, it is preferable to perform the step (III) in the PFPE bath, so as to avoid the shrinkage of the resin layer in the step (III).

The viscosity of the first PFPE at a temperature of 40° C. is preferably 10 mPa·s to 400 mPa·s, and more preferably 30 mPa·s to 350 mPa·s.

Examples of commercially available PFPE having such a viscosity range include "Krytox GPL-101" (viscosity of 12 mPa·s), "Krytox GPL-102" (viscosity of 26 mPa·s), "Krytox GPL-103" (viscosity of 54 mPa·s), "Krytox GPL-104" (viscosity of 111 mPa·s), "Fomblin M03" (viscosity of 30 mPa·s), and "Krytox GPL-105" (viscosity of 301 mPa·s) (all trade names, produced by Chemours Co., Ltd.).

In addition, for example, in a case where the viscosity (at 40° C., hereinafter the same) of the first PFPE is 301 mPa·s, the thickness of the resin layer containing the PFA is 20 μm, the melting point of the resin layer is 296° C., and the temperature at the time of contact between the resin layer and the first PFPE is 310° C., a PFPE-impregnated resin layer in which the content ratio of the first PFPE is 30% by mass can be produced at a contact time period of 1 minute.

In addition, when PFPE having a viscosity of 111 mPa·s is used as the first PFPE and the other conditions are the same as those described above, a PFPE-impregnated resin layer can be produced in which the content ratio of the first PFPE is 41% by mass. Furthermore, when PFPE having a viscosity of 111 mPa·s is used as the first PFPE, the temperature at the time of contact with the resin layer is set to 300° C., and the other conditions are the same as those described above, a PFPE-impregnated resin layer can be produced in which the content ratio of the first PFPE is 26% by mass.

In addition, when PFPE having a viscosity of 54 mPa·s is used as the first PFPE and the other conditions are the same as those described above, a PFPE-impregnated resin layer can be produced in which the content ratio of the first PFPE is 33% by mass. Furthermore, the above resin layer is immersed in a bath of the first PFPE at a temperature of 310° C., and the resin layer and the first PFPE are brought into contact with each other for one minute. Next, the PFPE bath is cooled to a temperature of 250° C., then the resin layer is taken out from the PFPE bath, and thereby a PFPE-impregnated resin layer can be obtained in which the content ratio of the first PFPE is 58% by mass. In addition, when the resin layer is taken out from the PFPE bath after the temperature of the PFPE bath has been cooled to 25° C., a PFPE-impregnated resin layer in which the content ratio of the first PFPE is 60% by mass can be obtained, on the assumption that the other conditions are the same as those described above.

For information, the content ratio of the first PFPE in the resin layer is greater by 2% by mass, in the case where the resin layer is taken out from the PFPE bath after the PFPE bath has been cooled to a temperature of 25° C. than in the case where the resin layer is taken out after the PFPE bath has been cooled to a temperature of 250° C. The reason is considered to be as follows. Specifically, the reason is because when the resin layer has been taken out from the PFPE bath after the PFPE bath has been cooled to a temperature of 25° C., volatilization of the first PFPE from the resin layer has been suppressed. For information, as long as the resin layer does not shrink, the volatilization of the first PFPE after the resin layer has been taken out from the PFPE bath does not affect the volume of the pore(s) in the resin layer formed through the step (IV).

On the other hand, PFPE (trade name: Krytox GPL-106, produced by Chemours Co., Ltd.) which is used in the Example of Japanese Patent Application Laid-Open No. 2020-140185 has a viscosity of 459 mPa·s. When such a PFPE has been brought into contact with a resin layer containing PFA at a temperature of 345° C. for 5 minutes, a PFPE-impregnated resin layer has been obtained in which the content ratio of the PFPE is 24% by mass. However, when the content ratio of the PFPE is about this level, the PFPEs do not agglomerate with each other in the resin layer. Because of this, even when the elution operation of the PFPE has been subsequently performed with the use of a fluorine-based solvent, pore(s) have not been formed in the resin layer.

As a method for bringing the resin layer and the first PFPE into contact with each other in the production of the fixing member, any method can be used as long as the first PFPE can be brought into contact with the resin layer at a temperature in the vicinity of the melting point of the PFA contained in the resin layer. In addition, the resin layer to be brought into contact with the first PFPE may be a resin layer in a layered product in which the base layer, the elastic layer and the resin layer are layered in advance, or a resin layer in such a state that after a PFA sheet or a PFA tube for the resin layer has been provided, the surface on the side to be bonded to the elastic layer is masked. In addition, examples of a contact method include a dipping method. In particular, such a method is preferable as to insert a tubular PFA into a base layer treated with a primer (for example, addition-curable silicone rubber), remove an excessive primer, cure the remaining primer to form a layered product, and then immerse the layered product in an impregnation apparatus containing a heated first PFPE. For information, the tubular PFA can be produced as a tube having a desired thickness, diameter, and length by a known method of, for example, extrusion molding, transfer molding, blow molding, or the like. The tubular PFA has no seam and a relatively uniform film thickness, and accordingly a resin layer which has an endless belt shape and excellent uniformity of the thickness can be easily formed.

In the step (IV), as the fluorine-based solvent to be used for removing the first PFPE impregnated in the resin layer, a solvent is used which can dissolve the first PFPE and does not dissolve the PFA. Then, the resin layer is immersed in the fluorine-based solvent so that the first surface is immersed. Here, examples of the "solvent capable of dissolving the first PFPE" include such a solvent that the amount of the first PFPE to be dissolved in 100 g of the solvent is 10 g or more at 25° C. On the other hand, examples of the "solvent that does not dissolve PFA" include such a solvent that the amount of the PFA to be dissolved in 100 g of the solvent is 1 g or less at 25° C. Examples of the fluorine-based solvent which can dissolve the first PFPE and does not dissolve the PFA include hydrofluoroether (trade name: Novec7300, produced by 3M Japan Limited). In addition, in the step (IV), it is preferable to apply ultrasonic waves to the resin layer, when the first PFPE is removed from the resin layer, in order to promote the removal of the first PFPE from the resin layer.

A method for producing the fixing member according to one embodiment of the present disclosure will be described more specifically.

Step (I): a layered product in which a base layer, an elastic layer containing silicone rubber, and a resin layer containing PFA are layered in this order is attached to a dipping apparatus.

Step (II): the layered product is immersed in a bath of the first PFPE heated to a temperature in the vicinity of the melting point of the PFA (300° C.±50° C., preferably 290° C. to 325° C.) and left preferably for 20 seconds to 5 minutes, more preferably for 30 seconds to 2 minutes (for example, 1 minute) (impregnation step-1).

In the impregnation step-1, it has been found that as the contact temperature between the resin layer and the first PFPE becomes higher, and the viscosity of the first PFPE becomes lower, the amount of the impregnated first PFPE increases. The contact temperature and the viscosity of the first PFPE can be appropriately selected, as long as the amount of the impregnated first PFPE is a certain amount or more by which the above specific pore(s) can be formed. In the impregnation step-1, when the heating temperature of the first PFPE is represented by X° C. and the melting point of the PFA is represented by Y° C., X-Y (° C.) is preferably 0° C. to 40° C., and more preferably 3° C. to 20° C.

Step (III): the layered product is taken out from the bath of the first PFPE and cooled to room temperature. For information, as described above, when the first PFPE having a low viscosity is used, it is preferable to perform the step (III) in the PFPE bath, in order to avoid a decrease in the amount of the PFPE in the resin layer due to volatilization of the first PFPE and shrinkage of the resin layer in the step (III).

Step (IV): after cooling, the layered product is immersed in a fluorine-based solvent which can dissolve the first PFPE and does not dissolve the PFA, and the first PFPE impregnated in the resin layer is eluted from the openings of the first surface of the resin layer (pore forming step). By this step, pore(s) opened on the first surface are formed in the resin layer.

Step (V-1): the layered product including the resin layer having pore(s) obtained through the above step is immersed in a mixture of the second PFPE and the mixture for forming the fluoropolymer, preferably for 5 minutes to 30 minutes, and more preferably for 10 minutes to 30 minutes (for example, 15 minutes). Thereby, the pore(s) in the resin layer are impregnated with the mixture (impregnation step-2).

The temperature of the mixture at this time is preferably a temperature at which curing of the mixture for forming the fluoropolymer resists proceeding at the time of impregnation. As a non-limiting example, the temperature of the mixture in this step is preferably 0° C. or higher and preferably 100° C. or lower. The temperature of the mixture is more preferably 50° C. or lower.

Step (V-2): the layered product obtained through the above step (V-1) is taken out from the mixture, and the mixture adhering to the outer surface is removed. Next, the mixture for forming the fluoropolymer in the mixture is cured, which has been introduced into the pore(s), and the fluoropolymer is obtained. Thereby, a fixing member according to one embodiment of the present disclosure is obtained, which contains the composition containing the second PFPE and the fluoropolymer (preferably, gelled composition) in at least a part of the pore(s).

In the present step, a method of removing an excessive amount of the mixture adhering to the outer surface is not particularly limited, and examples thereof include a method of cleaning with a fluorine-based solvent, a method of removing with air, and a method of wiping with a non-woven fabric. Examples of the method of cleaning the mixture with a fluorine-based solvent include a method of removing the mixture with the use of a fiber such as a non-woven fabric which is impregnated with the fluorine-based solvent. Examples of the fluorine-based solvent include hydrofluoroether (trade name: Novec7300, produced by 3M Japan Limited).

A heating temperature and a heating time period in curing can be selected so that the reaction rate of the reaction components in the mixture for forming the fluoropolymer is set to a desired state. The heating temperature is preferably in a range of 100° C. to 250° C., and more preferably in a range of 150° C. to 200° C. The heating time period is preferably in a range of 60 seconds to 4 hours.

It is preferable that the surface free energy of the fixing member is 13.0 $mJ/m^2$ to 15.0 $mJ/m^2$, from the viewpoint of obtaining a high-quality image having high glossiness also for various paper media. For information, the surface free energy can be measured with the use of a contact angle meter (trade name: DM-501, manufactured by Kyowa Interface Science Co., Ltd., for example).

2. Fixing Apparatus

A fixing apparatus includes a fixing member and a heating unit that heats the fixing member. The fixing apparatus includes, for example, a rotator for heating, and a rotator for pressing, which is arranged so as to form a fixing nip portion with the rotator for heating. Examples of the combination of the rotator for heating and the rotator for pressing include: a heating roller and an elastic pressing roller which is arranged opposite to the heating roller; and a heating film and an elastic pressing roller which is arranged in contact with the heating film. Other examples of the combination of the rotator for heating and the rotator for pressing include: a heating belt and an elastic pressing roller which is arranged in contact with the heating belt; and a heating belt and an elastic pressing belt which is arranged in contact with the heating belt.

(1) Fixing Apparatus Using Fixing Belt

Figure 3:
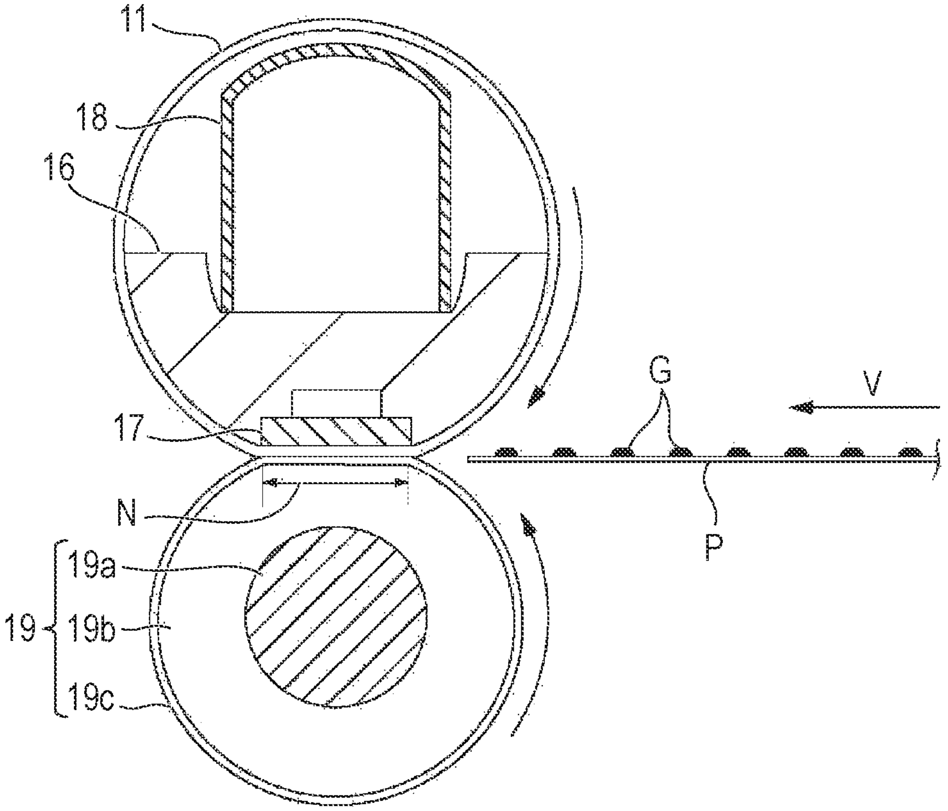
FIG. 3 illustrates a schematic cross-sectional view of a fixing apparatus using a fixing belt.

FIG. 3 is a cross-sectional view taken along the circumferential direction of the fixing belt in the fixing apparatus that includes the fixing belt 11 for heating and the elastic pressing roller 19.

The fixing belt 11 is a fixing belt according to one embodiment of the present disclosure. The fixing belt 11 is loosely fitted on a belt guide member 16. A pressing rigid stay 18 is inserted into the inside of the belt guide member 16. The belt guide member 16 is formed of, for example, a resin having heat resistance and/or heat insulating properties.

The heating unit is, for example, a heater which is arranged in contact with an inner peripheral surface of the fixing belt. A ceramic heater 17 serving as a heat source is provided at a position at which the belt guide member 16 comes in contact with an inner surface of the fixing belt 11. The ceramic heater 17 is fitted into and fixed to a groove portion which is provided along the longitudinal direction of the belt guide member 16. The ceramic heater 17 is energized by a unit (not illustrated) and generates heat.

In the elastic pressing roller 19, for example, an elastic layer **19*b* containing cured silicone rubber is provided on a peripheral surface of a core metal 19*a* made from stainless steel. A surface layer 19*c* containing a fluororesin is provided on a peripheral surface of the elastic layer 19*b*. The thickness of the surface layer 19*c*** is, for example, 50 μm.

A pressing spring (not illustrated) is arranged between both edge portions of the pressing rigid stay 18 and a spring receiving member (not illustrated) on the apparatus chassis side, and thereby a pressing-down force is applied to the pressing rigid stay 18. Thereby, the lower surface of the ceramic heater 17 which is arranged on the lower surface of the belt guide member 16 and the upper surface of the elastic pressing roller 19 are pressed against each other while sandwiching the fixing belt 11, and thereby form a predetermined fixing nip portion N. In other words, the lower surface of the ceramic heater 17 is arranged in contact with the inner peripheral surface of the fixing belt 11. A recording medium P to be heated on which an image is formed by an unfixed toner G is nipped in the fixing nip portion N and conveyed at a conveying speed V. Thereby, the toner image is heated and pressurized. As a result, the toner image causes melting and mixing of the color; then is cooled; and thereby is fixed on the recording medium P.

(2) Fixing Apparatus Using Fixing Roller

Figure 4:
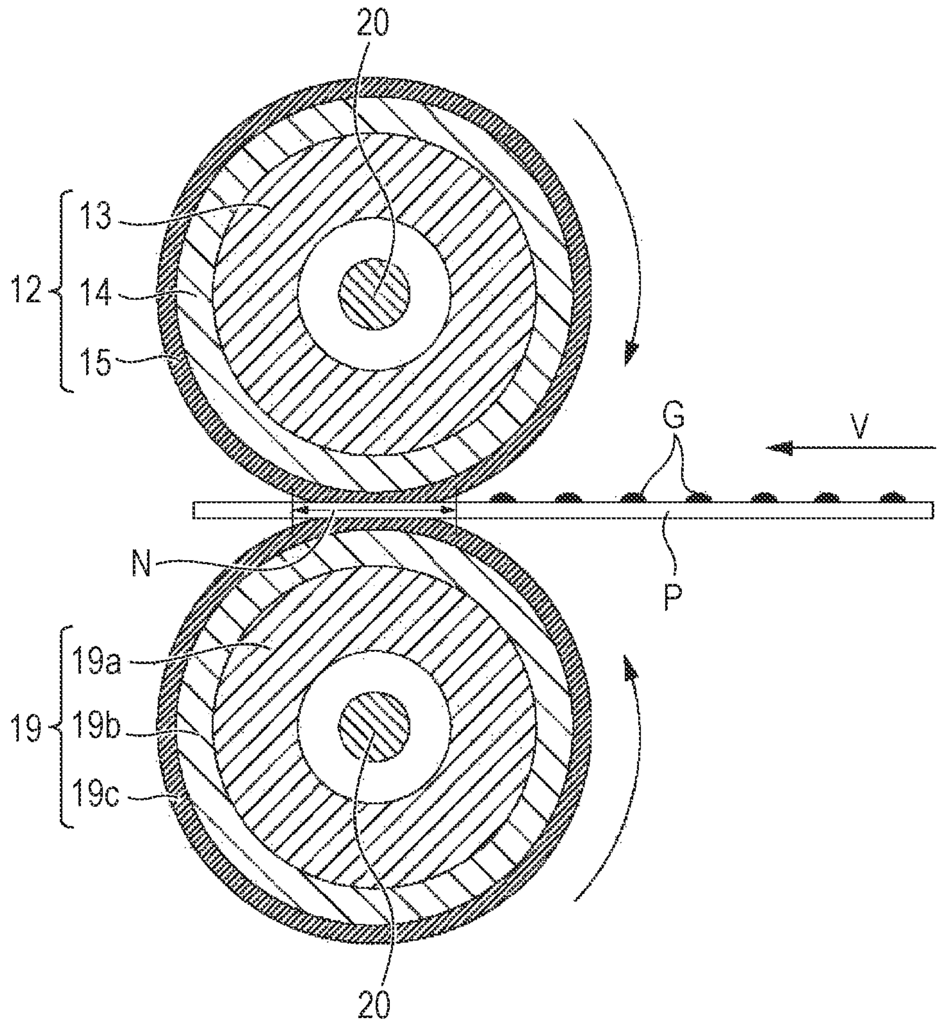
FIG. 4 illustrates a schematic cross-sectional view of a fixing apparatus using the fixing roller.

FIG. 4 is a cross-sectional view taken along the circumferential direction of the fixing roller in the fixing apparatus that includes the fixing roller 12 for heating and the elastic pressing roller 19 which is arranged so as to face the fixing roller 12, and a heater 20 which is a heating unit of the fixing roller 12.

The fixing roller 12 is a fixing roller according to one embodiment of the present disclosure. In the fixing roller 12, the elastic layer 14 is formed on an outer peripheral surface of the hollow core metal serving as the base layer 13, and the surface layer 15 is formed on a further outer side thereof.

The fixing roller 12 and the elastic pressing roller 19 are rotatably pressed against each other, by an unillustrated pressing unit to form the fixing nip portion N. In the insides of the fixing roller 12 and the elastic pressing roller 19, heaters 20 are provided as a heating source for supplying heat necessary for melting the unfixed toner G. A halogen heater is generally used as the heater 20. There is also a case where a plurality of halogen heaters are installed in the inside, so as to match the size of the conveyed recording medium P.

To the fixing roller 12 and the elastic pressing roller 19, a rotational force is applied through the edge portions of the base layer (core metal) 13 and the core metal 19*a* by an unillustrated unit, and the rotation of the fixing roller 12 is controlled so that a moving speed of the surface of the fixing roller 12 becomes substantially equal to a conveyance speed V of the recording medium P. At this time, the rotational force may be applied to either the fixing roller 12 or the elastic pressing roller 19 having elasticity, and the other may be rotated by the driven force; or the rotational force may be applied to both.

By the fixing nip portion N of the fixing apparatus, which has been formed in this way, the recording medium P that is a body to be heated is sandwiched and conveyed, on which an image is formed by the unfixed toner G. Thereby, the toner image is heated and pressurized. As a result, the toner image is melted, and colors are mixed. After that, the toner image is cooled, and is fixed on the recording medium P.

3. Electrophotographic Image Forming Apparatus

As the electrophotographic image forming apparatus, a known configuration can be adopted. For example, there are a multifunction machine, a copier, a facsimile, a printer and the like, which use an electrophotographic method. Here, an outline of an overall configuration of the electrophotographic image forming apparatus will be described with the use of a color laser printer as an example.

Figure 5:
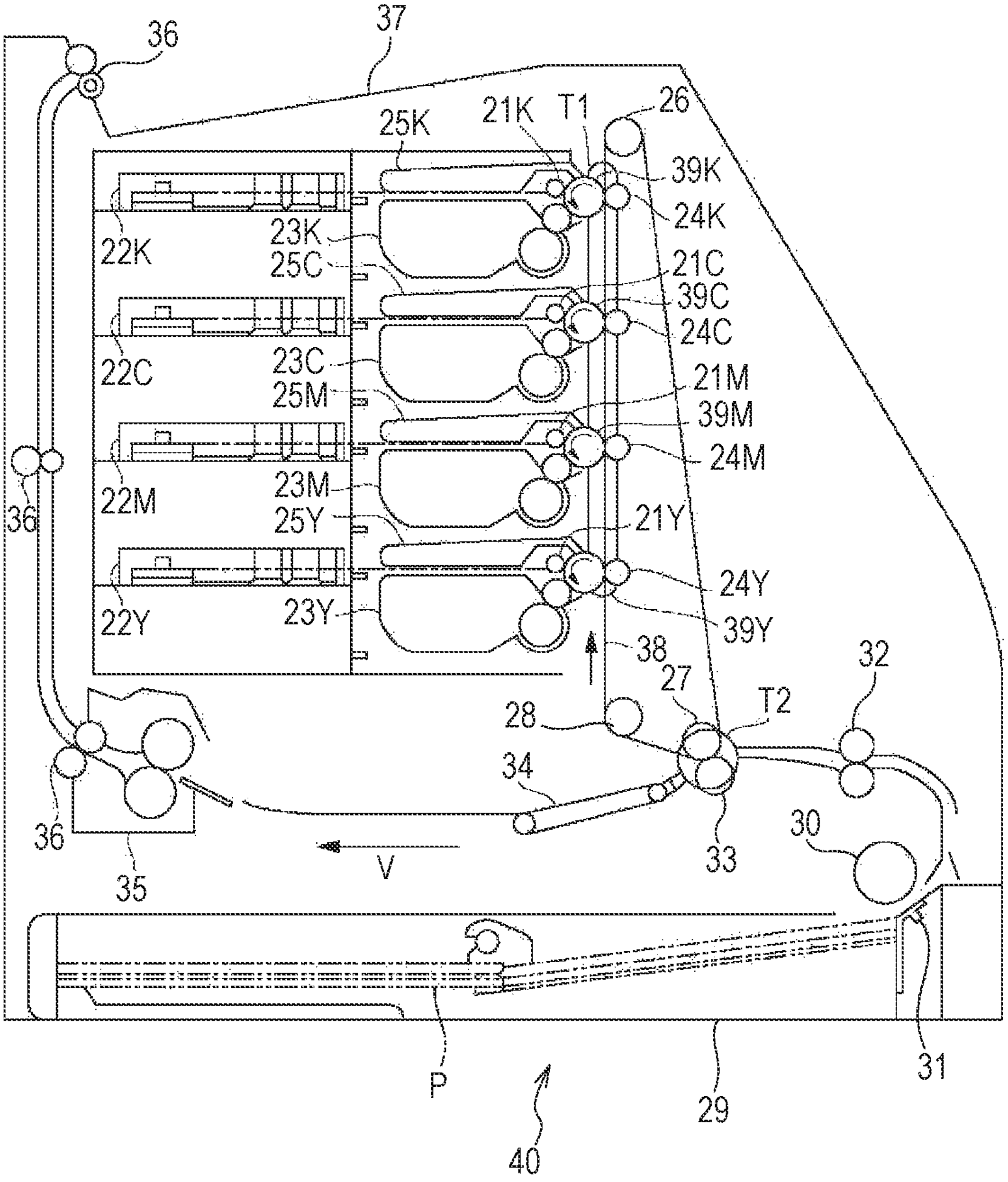
FIG. 5 illustrates a schematic cross-sectional view illustrating an electrophotographic image forming apparatus according to one embodiment of the present disclosure.

FIG. 5 is a schematic cross-sectional view of a laser printer 40 according to one embodiment of the present disclosure. The laser printer 40 illustrated in FIG. 5 includes an image forming unit that includes an electrophotographic photosensitive drum (hereinafter referred to as "photosensitive drum") 39 which rotates at a constant speed, for each color of yellow (Y), magenta (M), cyan (C) and black (K). In addition, the laser printer 40 has an intermediate transfer member 38 that retains a color image thereon which has been developed and multi-transferred in the image forming unit, and further transfers the color image onto a recording medium P which has been fed from a feeding unit.

The photosensitive drum 39 (39Y, 39M, 39C and 39K) is rotationally driven counterclockwise by a driving unit (not illustrated), as illustrated in FIG. 5. Around the photosensitive drum 39, there are arranged sequentially according to the rotation direction thereof: a charging apparatus 21 (21Y, 21M, 21C and 21K) that uniformly charges the surface of the photosensitive drum 39; a scanner unit 22 (22Y, 22M, 22C and 22K) that emits a laser beam on the basis of image information and forms an electrostatic latent image on the photosensitive drum 39; a developing unit 23 (23Y, 23M, 23C and 23K) that attaches toner to the electrostatic latent image and develops a toner image; a primary transfer roller 24 (24Y, 24M, 24C and 24K) that transfers the toner image on the photosensitive drum 39 to the intermediate transfer member 38 at a primary transfer unit T1; and a cleaning unit 25 (25Y, 25M, 25C and 25K) that has a cleaning blade for removing a residual toner which has remained on the surface of the photosensitive drum 39 after transfer.

At the time of image formation, the belt-shaped intermediate transfer member 38 which is stretched by the rollers 26, 27 and 28 rotates, and the color toner images formed on the respective photosensitive drums 39 are superimposed on the intermediate transfer member 38 and primarily transferred thereonto, thereby the color image is formed.

The recording medium P is conveyed to a secondary transfer unit T2 by a conveying unit so as to be synchronized with the primary transfer to the intermediate transfer member 38. The conveying unit includes a feeding cassette 29 that stores a plural sheets of recording media P therein, a feeding roller 30, a separation pad 31, and a resistance roller pair 32. At the time of image formation, the feeding roller 30 is driven and rotated according to the image forming operation, and separates the recording media P in the feeding cassette 29 one by one, and conveys the recording medium P to the secondary transfer unit T2 by the resistance roller pair 32 at the same timing as the image forming operation.

In the secondary transfer unit T2, a movable secondary transfer roller 33 is arranged. The secondary transfer roller 33 is movable in a substantially vertical direction. Then, when an image is transferred, the secondary transfer roller 33 is pressed against the intermediate transfer member 38 with a predetermined pressure via the recording medium P. At this time, a bias is applied to the secondary transfer roller 33 at the same time, and the toner image on the intermediate transfer member 38 is transferred to the recording medium P. The intermediate transfer member 38 and the secondary transfer roller 33 are respectively driven, and accordingly, the recording medium P in a state of being sandwiched therebetween is conveyed at a predetermined conveying speed V in the direction of the left arrow illustrated in FIG. 5, and further is conveyed to the fixing unit 35 which is a next step, by a conveying belt 34. At the fixing unit 35, heat and pressure are applied, and the transferred toner image is fixed on the recording medium P. The recording medium P is discharged onto a discharge tray 37 on an upper surface of the apparatus by a discharge roller pair 36.

Then, when the fixing apparatuses illustrated in FIG. 3 and FIG. 4 are each applied to the fixing unit 35 of the electrophotographic image forming apparatus illustrated in FIG. 5, image forming apparatuses can be obtained which can provide a high-quality image excellent in image uniformity.

According to one embodiment of the present disclosure, a fixing member can be obtained that can maintain high toner releasing properties over a longer period of time. According to another embodiment of the present disclosure, a fixing apparatus and an electrophotographic image forming apparatus can be obtained which can stably form a high-quality electrophotographic image over a long period of time.

EXAMPLES

The present disclosure will be specifically described below with reference to Examples. Note that the present disclosure is not limited to the following Examples. In the present Example, a fixing member was produced with the use of the following PFA, perfluoropolyethers, and mixture for forming a fluoropolymer.

(PFA)

PFA-1: "959HP-Plus" (trade name, produced by Chemours-Mitsui Fluoro Products Co., Ltd., and melting temperature=296° C.)

PFA-2: "451HP-J" (trade name, produced by Chemours-Mitsui Fluoroproducts Co., Ltd., and melting point=305° C.)

(Perfluoropolyether)

PFPE-1: "Krytox GPL-104" (trade name, produced by Chemours, and viscosity: 111 mPa·s (40° C.))

PFPE-2: "Krytox GPL-107" (trade name, produced by Chemours, and viscosity: 851 mPa·s (40° C.))

PFPE-3: "Krytox VPF-16256" (trade name, produced by Chemours, and viscosity: 1403 mPa·s (40° C.))

PFPE-4: "Krytox XHT-1000" (trade name, produced by Chemours, and viscosity: 1941 mPa·s (40° C.))

PFPE-5: "Fomblin M100" (trade name, produced by Solvay Specialty Polymers, and viscosity: 1327 mPa·s (40° C.))

PFPE-6: "Krytox GPL-103" (trade name, produced by Chemours, and viscosity: 54 mPa·s (40° C.))

(Mixture for Forming Fluoropolymer)

FP-1: "SIFEL X-71-359" (trade name, produced by Shin-Etsu Chemical Co., Ltd., and viscosity: 8600 mPa·s (23° C.))

Example 1

<Production of Fixing Belt>

[Production of Layered Product Having Base Layer, Elastic Layer, and Resin Layer Containing PFA]

As a base layer, a base material made of electroformed nickel, having an endless belt shape, and having an inner diameter of 30 mm, a width of 400 mm and a thickness of 40 μm was provided. The outer peripheral surface of the base material was subjected to primer treatment.

As a raw material for forming the elastic layer, an addition curing type of liquid silicone rubber (trade name: SE1886, produced by Dow Corning Toray Co., Ltd.) was provided which did not contain filler. To 61 parts by volume of the liquid silicone rubber, 38 parts by volume of spherical alumina (trade name: ALUNABEADS/CB-A30S, produced by Showa Denko K.K.) were added as a spherical filler, and 1 part by volume of vapor-grown carbon fiber (trade name: VGCF-S, produced by Showa Denko K.K., aspect ratio=100, and average fiber length=10 μm) was added as a heteromorphic filler.

Thus, an addition curing type silicone rubber composition for forming the elastic layer was prepared. The composition was applied onto the outer peripheral surface of the above base layer by use of a ring coating method, followed by heating at a temperature of 200° C. for 4 hours to crosslink the layer of the addition curing type silicone rubber composition, thereby forming an elastic layer which had a thickness of 300 μm.

The surface of the elastic layer was irradiated with ultraviolet light under an air atmosphere with the use of an ultraviolet lamp which was arranged at a position at which the distance from the surface of the elastic layer was 10 mm, while the base layer having the elastic layer formed thereon was rotated at a moving speed of 20 mm/sec in the circumferential direction. As the ultraviolet lamp, a low-pressure mercury ultraviolet lamp (trade name: GLQ 500US/11, manufactured by Toshiba Lighting & Technology Corporation) was used, and ultraviolet light was emitted so that the integrated amount of light having a wavelength of 185 nm on the irradiated surface became 800 mJ/cm$^2$.

Subsequently, an addition curing type silicone rubber adhesive agent (trade name: SE1819CV, and mixture of equal amounts of "Liquid A" and "Liquid B" produced by Dow Corning Toray Co., Ltd.) was applied substantially uniformly to the surface of the elastic layer so that the thickness became 20 μm.

Next, the elastic layer of which the adhesive agent was applied on the surface thereof, was covered with a fluororesin tube (PFA-1, melting point of 296° C., and thickness of 20 μm) having an inner surface subjected to hydrophilic treatment, the belt surface was drawn uniformly from above the fluororesin tube, and thereby, an excess adhesive was squeezed out from between the elastic layer and the fluororesin tube. Then, the base layer covered with the elastic layer and the fluororesin tube was placed in an electric furnace which was set at a temperature of 200° C., and was heated for 1 hour; and thereby the adhesive was cured, and the fluororesin tube was bonded onto the elastic layer. Subsequently, both ends were cut off, and a layered product having an endless shape was obtained, of which the width was 343 mm.

[Contact Impregnation of PFPE]

[Impregnation Step-1]

The first PFPE (PFPE-1) was charged into a measuring cylinder made from borosilicate glass. An electric heating wire covered with a heat insulating material was wound around the whole measuring cylinder, and heated the cylinder so that the temperature of the first PFPE became 310° C. The layered product produced in the above was attached to a dipping apparatus; and the layered product was immersed in the heated first PFPE for 1 minute, and was taken out.

Evaluation A-1: Measurement of Content Ratio of First PFPE in Resin Layer Impregnated with First PFPE The content ratio of the first PFPE in the obtained resin layer impregnated with the first PFPE was measured by the following method. Specifically, a layered product sample of the elastic layer and the resin layer was cut out from the layered product. Next, the layered product sample was immersed in a dissolving agent for a silicone resin (trade name: eSolve 21RS, produced by Kaneko Chemical Co., Ltd.) to dissolve the silicone rubber in the elastic layer, and thereby the elastic layer was removed from the layered product sample. In this way, a measurement sample was prepared which was composed of only the entire thickness portion of the resin layer. This measurement sample was subjected to measurement using a thermogravimetric analyzer (TGA) under the following conditions, and the content ratio (% by mass) of the first PFPE in the resin layer was calculated which contained the first PFPE.

Apparatus: TGA851 (trade name, manufactured by METTLER TOLEDO)

Atmosphere: in the air

Temperature: 425° C.

A linear least squares approximation equation was obtained from a region in which the slope became constant and only the PFA decreased, in the profile of the measurement time—weight reduction rate, which was obtained by the above thermogravimetric analysis. Then, the intercept of the linear least squares approximation equation was defined as the PFA content ratio (% by mass), and the content ratio (% by mass) of the first PFPE was calculated as 100-PFA content ratio.

(Pore Forming Step)

After the layered product obtained in the impregnation step-1 was cooled to room temperature, the layered product was immersed for 10 minutes in a measuring cylinder into which a separately provided fluorine-based solvent (trade name: Novec7300, produced by 3M Japan Limited) was charged. Next, the measuring cylinder was placed in a water tank of an ultrasonic cleaning apparatus (trade name: Bransonic (model: 2510J-DTH), manufactured by Emerson Japan, Ltd.), and ultrasonic waves were applied thereto for 60 minutes. After the treatment, the layered product was taken out from the measuring cylinder, and left to stand in an environment at a temperature of 25° C. for 60 minutes to be dried. Thus, such a layered product was obtained that the first PFPE existing on the surface and in the inside of the resin layer was removed. For information, an appearance of the obtained layered product was visually whitened, and it was confirmed that pore(s) were formed in the resin layer.

Figure 2A:
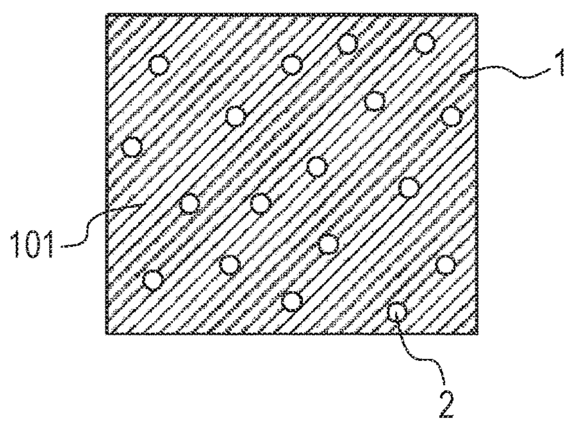
FIG. 2A illustrates a surface observation image of a resin layer of a fixing belt according to Example 1.
Figure 2B:
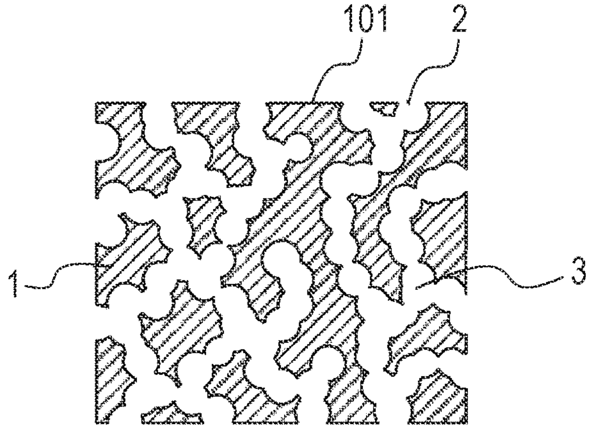
FIG. 2B illustrates a cross-sectional image of the resin layer at the time when a cross-section in a direction along a belt circumferential direction is observed.
Figure 2C:
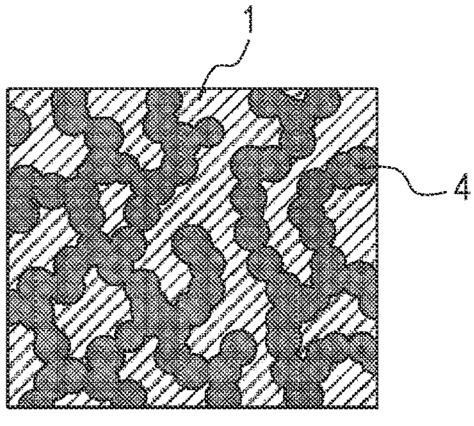
FIG. 2C illustrates a cross-sectional image of the surface layer.

FIG. 2A and FIG. 2B illustrate schematic views of images which were observed with a scanning electron microscope of the first surface of the resin layer of the obtained layered product, and a cross section of the layered product in a direction along the circumferential direction.

FIG. 2A is a schematic view of an SEM image of the first surface. On the first surface 101 of the obtained layered product, a resin portion 1 containing the PFA and an opening 2 were observed. In addition, FIG. 2B is a schematic view of an SEM image of the cross section of the resin layer in a direction along the circumferential direction of the layered product. In the obtained layered product, the resin portion 1 containing the PFA and a pore 3 were observed. In addition, it was also observed that the pore 3 had the opening 2 leading to the first surface 101.

Evaluation A-2: Calculation of Opening Ratio P1, Average Opening Diameter and Porosity P2 on First Surface of Surface Layer (Resin Layer)

An opening ratio P1 and an average opening diameter on the first surface of the surface layer (resin layer) were calculated in the following way.

The surface of the layered product that was obtained in the above pore forming step, from which the first PFPE was removed, in other words, the surface of the resin layer opposite to the side facing the elastic layer was observed with a scanning electron microscope, and an SEM image (magnification of 10000 times) of a rectangular observation region was acquired which was 8 μm in length×11 μm in width. The resolution was set to 717 pixels in length and 986 pixels in width so that the opening could be recognized. The acquired SEM image was converted to an 8-bit grayscale image with the use of image processing software (trade name: Image-J, produced by US National Institutes of Health (NIH)). A median filter was applied to the obtained grayscale image, the resultant image was further subjected to binarization processing with the use of the above image processing software, and a binarized image was obtained. In the binarization processing, the YEN's method was used in order to discriminate between a portion corresponding to an opening in the SEM image and a portion corresponding to the PFA. Then, a ratio was calculated between the number of pixels of the portion corresponding to the opening and the number of pixels of the whole image, in the obtained binarized image. Here, the observation regions were placed at arbitrary 10 places on the surface having openings in the resin layer, and the arithmetic mean value of the ratios calculated from each of the observation regions was defined as the opening ratio P1. For information, the observation regions were positioned so as not to overlap each other.

In addition, as for the average opening diameter, an area of the portion corresponding to the opening in each binarized image was approximated by a perfect circle having the same area, and the average opening diameter was determined to be an arithmetic mean value of the diameters of the perfect circles (hereinafter referred to as circle equivalent diameters).

In addition, the porosity P2 was calculated in the following way.

A cross section sample was cut out from the resin layer of the layered product from which the first PFPE was removed, with the use of a Cryo-Ultramicrotome (manufactured by Leica Microsystems) so that the cross section of the resin layer in a direction along the circumferential direction of the layered product appeared. The cross section was determined to include the entire thickness portion of the resin layer. Next, the cross section was observed with a scanning electron microscope, and an SEM image of an observation region was obtained which was 8 μm in length×11 μm in width. The resolution was set to 717 pixels in length and 986 pixels in width so that pore(s) appearing in the cross section could be recognized. The obtained SEM image was subjected to the binarization processing with the use of numerical calculation software (trade name: MATLAB (registered trademark), produced by MathWork), and a binarized image was obtained. In the binarization processing, the Otsu's method was used to discriminate between a portion corresponding to the pore in the SEM image and a portion corresponding to the PFA. Then, the ratio was calculated between the number of pixels of a portion corresponding to the pore in the binarized image and the number of pixels of the whole image. The acquisition positions of the SEM image in the thickness direction of the cross section of the cross section sample were three places which were defined by the following (I) to (III).

(I) A position in the cross section of the cross section sample, at which 1 μm from a surface on one side of the surface layer (hereinafter also referred to as "first surface") toward a surface on the other side (hereinafter also referred to as "second surface") becomes an upper end of an observation region, and a long side of the observation region becomes parallel to the first surface.

(II) A position in the cross section of the cross section sample, at which the middle point between the first surface and the second surface of the surface layer coincides with the center of gravity of the observation region, and the long side of the observation region becomes parallel to the first surface.

(III) A position in the cross section of the cross section sample, at which 1 μm from the second surface of the surface layer toward the first surface becomes the lower end of the observation region, and the long side of the observation region becomes parallel to the second surface.

In addition, the cross section sample was cut out from three places at 120° intervals in the circumferential direction of the layered product.

Accordingly, a total of nine SEM images were obtained by the above operation, and ratios of nine images were calculated on the basis of the binarized images which were created from each of the SEM images. The arithmetic mean value of the ratios of these nine images was defined as a porosity P2.

Impregnation Step-2

Next, a layered product provided with a resin layer having pore(s), which was obtained through the pore forming step described above, was subjected to the following operation. Specifically, a mixture A was prepared which contained the second PFPE (PFPE-3) and the mixture (FP-1) for forming the fluoropolymer. The content ratio (mass ratio) of the second PFPE to the mass of the mixture A was set to 0.19. The obtained mixture A was charged into a measuring cylinder made of borosilicate glass. The second PFPE dissolves in the mixture for forming the fluoropolymer, and the mixture A was a transparent liquid. Subsequently, the layered product was attached to a dipping apparatus, and the whole layered product was immersed in the mixture A for 30 minutes, and was then taken out. The immersion was carried out at room temperature (25° C.).

Next, the mixture A adhering to the outer surface of the layered product which was taken out from the mixture A was removed with the use of a non-woven fabric impregnated with a fluorine-based solvent (trade name: Novec7300, produced by 3M Japan Limited). Next, the layered product was placed in an oven and heated at a temperature of 200° C. for 1 hour, and the mixture for forming the fluoropolymer was cured. Thus, a fixing belt No. 1 according to the present Example was obtained, which had a surface layer containing a composition in the pore(s), which contained the fluoropolymer that was a cured product of FP-1 and the PFPE-3. FIG. 2C illustrates a schematic view of an observation image of the cross section of the surface layer in a direction along the circumferential direction of the obtained fixing belt, by a scanning electron microscope. It was confirmed that the pore 3 observed in FIG. 2B was filled with the composition 4 containing the second PFPE and the fluoropolymer, due to the impregnation step-2.

Evaluation A-3: Content Ratio of Composition Containing Second PFPE and Fluoropolymer in Surface Layer A measurement sample consisting of only the entire thickness portion of the surface layer was obtained in the same manner as in the previously described method, from the obtained fixing belt. The measurement sample was subjected to measurement using a thermogravimetric analyzer (TGA) under the following conditions, and the content ratio (% by mass) of the composition that contained the second PFPE and the fluoropolymer in the pore(s) to the total mass of the surface layer was calculated, which included the mass of the composition.

Apparatus: TGA851 (trade name, manufactured by METTLER TOLEDO)

Atmosphere: in the air

Temperature: 425° C.

A linear least squares approximation equation was obtained from a region in which the slope became constant and only the PFA decreased, in the profile of the measurement time—weight reduction rate, which was obtained by the above thermogravimetric analysis. Then, the intercept of the linear least squares approximation equation was defined as the PFA content ratio (% by mass), and the content ratio (% by mass) of the composition containing the second PFPE and the fluoropolymer was calculated as 100-PFA content ratio.

Evaluation A-4: Content Ratio of Second PFPE in Composition Containing Second PFPE and Fluoropolymer A measurement sample consisting of only the entire thickness portion of the surface layer was obtained in the same manner as in the previously described method, from the fixing belt having the surface layer having the pore(s) filled with the composition which contained the second PFPE and the fluoropolymer. First, a mass C of the measurement sample was measured. Next, the measurement sample was immersed in a beaker containing a fluorine-based solvent (trade name: Novec7300, produced by 3M Japan Limited), which was provided separately, so as to be completely immersed in the fluorine-based solvent. Next, the beaker was placed in the water tank of the ultrasonic cleaning apparatus (trade name: Bransonic (model 2510J-DTH), manufactured by Emerson Japan, Ltd.), ultrasonic waves were applied thereto for 120 minutes, and the second PFPE in the pore(s) was eluted. For information, it was confirmed that the fluoropolymer in the pore(s) was not eluted even by this operation. After the treatment, the measurement sample was taken out from the beaker, and left to stand in an environment at a temperature of 25° C. for 60 minutes to be dried. A mass D of the measurement sample after drying was measured, and the content ratio (% by mass) of the second PFPE in the surface layer was determined from $[(C-D)/C]\times 100$. The content ratio of the second PFPE in the composition containing the second PFPE and the fluoropolymer (content ratio (% by mass) of second PFPE/content ratio (% by mass) of composition containing second PFPE and fluoropolymer) was calculated from the obtained content ratio of the second PFPE in the surface layer, and the content ratio of the composition containing the second PFPE and the fluoropolymer in the surface layer, which was calculated by the previously described method.

(Solubility Parameter Difference)

The solubility parameter difference (ΔHSP) was 2.8 $(MPa)^{0.5}$ between the PFA (PFA-1) which was used in Example 1, and the compound having a vinyl group at both terminals, which had the structure represented by the structural formula (7) in the mixture for forming the fluoropolymer (FP-1). For information, the ΔHSP was calculated on the basis of the previously described method.

The obtained fixing belt was subjected to the following evaluations B-1 and B-2.

Evaluation B-1: Evaluation of Toner Effset and Separability of Thin Plain Paper The fixing belt was attached to an electrophotographic image forming apparatus (trade name: imageRUNNER-ADVANCE C5500, manufactured by Canon Inc.) in which an angle of a separation claw of paper was adjusted. Then, such an image forming step was carried out as to form a cyan solid image of 100 mm×100 mm on A4 size paper (trade name: CHAMEX, produced by International Paper, and basis weight 75 $g/m^2$). For information, the fixing temperature was set to 180° C., and the paper conveyance speed was set to 300 mm/sec.

Then, at each time point when the number of formed cyan solid images reached 1, 10,000 and 600,000 sheets, one sheet of A4-size thin plain paper (basis weight of 46 $g/m^2$)

was passed through the apparatus in which a cyan toner was arranged so that the cyan solid image of 100 mm×100 mm was formed at a position at which the leading edge margin became 4 mm, and a cyan solid image was formed. When the toner is offset to the surface layer of the fixing belt at the time of fixing of the solid image, the toner is transferred to a white background portion of the thin plain paper after the fixing belt has rotated once. Then, five evaluators visually observed each of the obtained three solid images, evaluated the presence or absence of a difference between densities at a position of the thin plain paper to which offset toner adhered and a white background portion of the thin plain paper, and ranked the results according to the following criteria. For information, when the thin plain paper adhered to the fixing film in the fixing step, and the thin plain paper was not separated from the fixing film, the presence or absence of the above density difference was not evaluated, and the fact was recorded: and the results were evaluated in the following way.

Evaluation Criteria

Rank A: All five evaluators determined that there was no density difference.

Rank B: Three to four of the five evaluators determined that there was no density difference.

Rank C: Three or more of the five evaluators determined that there was the density difference.

Rank D: The thin plain paper adhered to the fixing belt, and the density difference was not evaluated.

Evaluation B-2: Measurement of Surface Free Energy

In evaluation 1, the surface free energy of the outer surface of the fixing belt immediately before the fixing belt forms a solid image on thin plain paper was calculated by "Kitazaki Hata Method" described in "Journal of the Adhesion Society of Japan", Adhesion Society of Japan, Vol. 8, No. 3 (1972): 131-141. Specifically, contact angles with water, n-hexadecane and diiodomethane, on the outer surface of the fixing belt, were measured (measuring environment: temperature of 23° C., and relative humidity of 55%).

Subsequently, the surface free energy was obtained with the use of the measurement result of each contact angle, based on the "expanded Fowkes equation" according to the theory of Kitazaki and Hata ("Journal of the Adhesion Society of Japan", Adhesion Society of Japan, Vol. 8, No. 3 (1972): 131-141).

A contact angle meter (trade name: DM-501, manufactured by Kyowa Interface Science Co., Ltd.) was used for the measurement. In addition, for an analysis of the surface free energy, analysis software (trade name: FAMAS, produced by Kyowa Interface Science Co., Ltd.) was used.

Examples 2 to 9

Fixing belts according to Examples 2 to 9 were produced in the same manner as in Example 1, except that mixtures were used respectively of which the proportions of the second PFPE in the mixture A of the second PFPE and the mixture for forming the fluoropolymer were changed, as the mixture which was introduced into the pore(s) in the impregnation step-2. The results of evaluations A-1 to A-4 and B-1 to B-2 of each of the obtained fixing belts are shown in Table 1 and Table 2.

Example 10

A layered product having a resin layer having pore(s) was produced in the same manner as in Example 1, except that the treatment temperature in the impregnation step-1 was changed to the temperature shown in Table 1. In addition, a fixing belt was produced in the same manner as in Example 5 after the impregnation step-2. The results of evaluations A-1 to A-4 and B-1 to B-2 of the obtained fixing belt are shown in Table 1 and Table 2.

Examples 11 to 13

Fixing belts were produced in the same manner as in Example 5, except that types of the second PFPE to be used in the impregnation step-2 were changed as shown in Table 1. The results of evaluations A-1 to A-4 and B-1 to B-2 of the obtained fixing belts are shown in Table 1 and Table 2.

Example 14

A layered product having a resin layer having pore(s) was produced in the same manner as in Example 1, except that the type of PFA to be used for forming the surface layer and the treatment temperature in the impregnation step-1 were changed as shown in Table 1. A fixing belt was produced in the same manner as in Example 5 after the impregnation step-2. The results of evaluations A-1 to A-4 and B-1 to B-2 of the obtained fixing belt are shown in Table 1 and Table 2.

For information, the solubility parameter difference (ΔHSP) was 4.6 $(MPa)^{0.5}$ between the type of the PFA (PFA-2) which was used in the present Example, and the compound having a vinyl group at both terminals, which had the structure represented by the structural formula (7) in the mixture for forming the fluoropolymer (FP-1).

Example 15

In the impregnation step-1, PFPE-6 was used as the first PFPE, and the layered product was immersed in the first PFPE which was heated so as to become 310° C., for 1 minute. The temperature of the first PFPE was then lowered at a rate of 6° C. per minute, and the layered product was taken out when the temperature of the first PFPE reached 250° C. A layered product having a resin layer having pore(s) was produced in the same manner as in Example 1, except the above description. A fixing belt was produced in the same manner as in Example 5 after the impregnation step-2. The results of evaluations A-1 to A-4 and B-1 to B-2 of the obtained fixing belt are shown in Table 1 and Table 2.

Example 16

A layered product having a resin layer having pore(s) was produced in the same manner as in Example 15, except that the layered product was immersed in the first PFPE heated to 310° C. for 1 minute in the impregnation step-1, and the layered product was taken out when the temperature of the first PFPE reached 25° C. A fixing belt was produced in the same manner as in Example 5 after the impregnation step-2. The results of evaluations A-1 to A-4 and B-1 to B-2 of the obtained fixing belt are shown in Table 1 and Table 2.

Comparative Example 1

A layered product having a base layer, an elastic layer, and a resin layer containing PFA was produced in the same manner as in Example 1, and this layered product was determined to be a fixing belt according to the present Comparative Example. The produced fixing belt was subjected to evaluation 1 and evaluation 2 described in Example 1. Note that the results of evaluations B-1 to B-2 of the fixing belt according to the present Comparative Example are shown in Table 1 and Table 2. For information, the fixing belt according to the present Comparative Example was not subjected to the impregnation step-1 and the impregnation step-2, and accordingly was not subjected to the evaluations A-1 to A-4.

Comparative Example 2

A layered product having a resin layer impregnated with the first PFPE was produced in the same manner as in Example 1, except that the type of the first PFPE and the treatment temperature in the impregnation step-1 were changed as described in Table 1. Subsequently, an operation of removing the first PFPE from the resin layer was performed in the same manner as in Example 1. However, the first PFPE in the resin layer was not removed, and pore(s) were not formed in the resin layer. This is considered to be because the amount of impregnated first PFPE was small, the PFPE impregnated in the resin layer did not agglomerate and join with each other, and the PFPE entered between the molecules of the PFA and was not able to be eluted by the solvent. Because of this, the layered product was not subjected to the impregnation step-2, and the layered product having the resin layer containing the first PFPE was determined to be a fixing belt according to the present Comparative Example. The results of evaluations A-1 and B-1 to B-2 of this fixing belt are shown in Table 1 and Table 2. For information, regarding the fixing belt in Comparative Example 2, pore(s) were not be formed in the resin layer, as described above, and the impregnation step-2 was not able to be performed, thus, evaluations A-2 to A-4 were not performed.

Comparative Example 3

In the impregnation step-2, only the second PFPE was introduced into the pore(s). First, the PFPE-3 was mixed with a fluorine-based solvent (trade name: Novec7300, produced by 3M Japan Limited), and a solution of 38% by mass of the PFPE-3 was prepared. The solution was introduced into the pore(s) in the resin layer in the same manner as in Example 1, except that the solution was used in the impregnation step-2. Next, the layered product having the resin layer in which the solution was introduced into the pore(s) was left to stand in an environment at a temperature of 60° C. for 60 minutes, and the fluorine-based solvent in the solution was evaporated which was introduced into the pore(s). The layered product obtained in this way, in which only the PFPE-3 was introduced into the pore(s), was designated as a fixing belt according to the present Comparative Example. The results of evaluations A-1 to A-3 and B-1 to B-2 of the fixing belt are shown in Table 1 and Table 2. For information, the fluoropolymer was not introduced into the pore(s), and accordingly the evaluation A-4 was not performed.

Comparative Example 4

A fixing belt was produced in the same manner as in Example 1 except that in the impregnation step-2, only the mixture for forming the fluoropolymer was introduced to the pore(s). The results of evaluations A-1 to A-3 and B-1 to B-2 of the obtained fixing belt are shown in Table 1 and Table 2. For information, the PFPE was not introduced into the pore(s), and accordingly, evaluation A-4 was not performed.

TABLE 1

| | | Impregnation step-1 | | Content ratio of first PFPE | Physical characteristics of resin layer | | | Impregnation step-2 | | | Content ratio of second PFPE | Content ratio of composition |
|---|---|---|---|---|---|---|---|---|---|---|---|---|
| | | | | | | | | Material | | Treat-ment | | |
| | Type of PFA | First type of PFPE | Treatment temperature [° C.] | in resin layer [% by mass] | P1 [%] | P2 [%] | Average opening diameter [nm] | Second type of PFPE | Mixture for forming fluoro-polymer | temper-ature [° C.] | PFPE in composition [mass ratio] | in surface layer [% by mass] |
| Example 1 | PFA-1 | PFPE-1 | 310 | 41 | 9.7 | 40.0 | 120 | PFPE-3 | FP-1 | 25 | 0.19 | 41 |
| Example 2 | PFA-1 | PFPE-1 | 310 | 41 | 9.7 | 40.0 | 120 | PFPE-3 | FP-1 | 25 | 0.22 | 41 |
| Example 3 | PFA-1 | PFPE-1 | 310 | 41 | 9.7 | 40.0 | 120 | PFPE-3 | FP-1 | 25 | 0.38 | 41 |
| Example 4 | PFA-1 | PFPE-1 | 310 | 41 | 9.7 | 40.0 | 120 | PFPE-3 | FP-1 | 25 | 0.41 | 41 |
| Example 5 | PFA-1 | PFPE-1 | 310 | 41 | 9.7 | 40.0 | 120 | PFPE-3 | FP-1 | 25 | 0.50 | 41 |
| Example 6 | PFA-1 | PFPE-1 | 310 | 41 | 9.7 | 40.0 | 120 | PFPE-3 | FP-1 | 25 | 0.58 | 41 |
| Example 7 | PFA-1 | PFPE-1 | 310 | 41 | 9.7 | 40.0 | 120 | PFPE-3 | FP-1 | 25 | 0.61 | 41 |
| Example 8 | PFA-1 | PFPE-1 | 310 | 41 | 9.7 | 40.0 | 120 | PFPE-3 | FP-1 | 25 | 0.78 | 41 |
| Example 9 | PFA-1 | PFPE-1 | 310 | 41 | 9.7 | 40.0 | 120 | PFPE-3 | FP-1 | 25 | 0.84 | 41 |
| Example 10 | PFA-1 | PFPE-1 | 300 | 26 | 6.5 | 27.0 | 75 | PFPE-3 | FP-1 | 25 | 0.50 | 26 |
| Example 11 | PFA-1 | PFPE-1 | 310 | 41 | 9.7 | 40.0 | 120 | PFPE-5 | FP-1 | 25 | 0.50 | 41 |
| Example 12 | PFA-1 | PFPE-1 | 310 | 41 | 9.7 | 40.0 | 120 | PFPE-2 | FP-1 | 25 | 0.50 | 41 |
| Example 13 | PFA-1 | PFPE-1 | 310 | 41 | 9.7 | 40.0 | 120 | PFPE-4 | FP-1 | 25 | 0.50 | 41 |
| Example 14 | PFA-2 | PFPE-1 | 320 | 30 | 7.3 | 30.0 | 90 | PFPE-3 | FP-1 | 25 | 0.50 | 30 |
| Example 15 | PFA-1 | PFPE-6 | 310/250 (*) | 58 | 12.4 | 60.0 | 180 | PFPE-3 | FP-1 | 25 | 0.50 | 60 |
| Example 16 | PFA-1 | PFPE-6 | 310/25 (**) | 60 | 12.4 | 60.0 | 180 | PFPE-3 | FP-1 | 25 | 0.50 | 60 |
| Comparative Example 1 | PFA-1 | — | — | — | — | — | — | — | — | — | — | — |
| Comparative Example 2 | PFA-1 | PFPE-3 | 315 | 15 | — | — | — | — | — | — | — | — |
| Comparative Example 3 | PFA-1 | PFPE-1 | 310 | 41 | 9.7 | 40.0 | 120 | PFPE-3 | — | 25 | — | 15 (***) |

TABLE 1-continued

| | Impregnation step-1: Type of PFA | Impregnation step-1: First type of PFPE | Impregnation step-1: Treatment temperature [° C.] | Content ratio of first PFPE in resin layer [% by mass] | Physical characteristics of resin layer: P1 [%] | Physical characteristics of resin layer: P2 [%] | Physical characteristics of resin layer: Average opening diameter [nm] | Impregnation step-2: Material: Second type of PFPE | Impregnation step-2: Material: Mixture for forming fluoro-polymer | Impregnation step-2: Treatment temperature [° C.] | Content ratio of second PFPE in composition [mass ratio] | Content ratio of composition in surface layer [% by mass] |
|---|---|---|---|---|---|---|---|---|---|---|---|---|
| Comparative Example 4 | PFA-1 | PFPE-1 | 310 | 41 | 9.7 | 40.0 | 120 | — | FP-1 | 25 | — | 39 (****) |

(*) After heating at 310° C., cooling to 250° C.
(**) After heating at 310° C., cooling to 25° C.
(***) Content of PFPE-3
(****) Content of fluoropolymer Table 2 shows the results of evaluation B-1 and evaluation B-2 of the fixing belts produced in Examples 1 to 16 and Comparative Examples 1 to 4.

TABLE 2

| | Evaluation rank of toner offset: One sheet passing | Evaluation rank of toner offset: 10,000 sheets passing | Evaluation rank of toner offset: 600,000 sheets passing | Surface free energy: Before paper passing [mJ/m$^2$] | Surface free energy: 10,000 sheets passing [mJ/m$^2$] | Surface free energy: 10,000 sheets passing Rate of change [%] | Surface free energy: 600,000 sheets passing [mJ/m$^2$] | Surface free energy: 600,000 sheets passing Rate of change [%] |
|---|---|---|---|---|---|---|---|---|
| Example 1 | A | B | B | 13.8 | 14.5 | 5% | 14.9 | 8% |
| Example 2 | A | A | B | 13.7 | 14.4 | 5% | 14.8 | 8% |
| Example 3 | A | A | B | 13.9 | 14.2 | 2% | 14.5 | 4% |
| Example 4 | A | A | A | 13.8 | 13.8 | 0% | 14.3 | 4% |
| Example 5 | A | A | A | 13.6 | 13.8 | 1% | 14.1 | 4% |
| Example 6 | A | A | A | 13.7 | 13.8 | 1% | 14.3 | 4% |
| Example 7 | A | A | B | 13.9 | 14.3 | 3% | 14.5 | 4% |
| Example 8 | A | A | B | 13.8 | 14.4 | 4% | 14.8 | 7% |
| Example 9 | A | B | B | 13.8 | 14.6 | 6% | 14.9 | 8% |
| Example 10 | A | A | B | 13.8 | 14.4 | 4% | 14.8 | 6% |
| Example 11 | A | B | B | 13.8 | 14.6 | 6% | 14.9 | 8% |
| Example 12 | A | A | B | 13.9 | 14.4 | 4% | 14.8 | 6% |
| Example 13 | A | A | B | 13.9 | 14.3 | 3% | 14.5 | 4% |
| Example 14 | A | A | B | 13.9 | 14.3 | 3% | 14.7 | 6% |
| Example 15 | A | A | A | 13.6 | 13.8 | 1% | 14.2 | 4% |
| Example 16 | A | A | A | 13.6 | 13.8 | 1% | 14.2 | 4% |
| Comparative Example 1 | C | C | D | 17.6 | 17.7 | 1% | 18.1 | 3% |
| Comparative Example 2 | A | C | D | 13.9 | 15.3 | 10% | 17.1 | 23% |
| Comparative Example 3 | A | B | D | 13.8 | 14.9 | 8% | 17.3 | 25% |
| Comparative Example 4 | C | D | D | 16.4 | 16.4 | 0% | 16.4 | 0% |

As shown in Table 2, it has been found that the fixing members according to Examples can maintain excellent toner releasing properties even in use over a long period of time, and as a result, can form high-quality electrophotographic images.

The present disclosure includes the following constitutions.

[Constitution 1]

A fixing member including a base layer and a surface layer, the surface layer containing a tetrafluoroethylene-perfluoroalkyl vinyl ether copolymer, and having at least one pore communicating with an opening on an outer surface thereof, a composition containing perfluoropolyether and a fluoropolymer being contained in at least a part of the at least one pore, wherein the fluoropolymer has a repeating unit represented by the following structural formula (1), and at least one structure selected from the group consisting of a T unit of siloxane and a Q unit of siloxane:

(1)

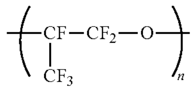

(in the structural formula (1), n represents a positive integer).

[Constitution 2]

The fixing member according to Constitution 1, wherein the perfluoropolyether has a structure represented by the following structural formula (2):

(2)

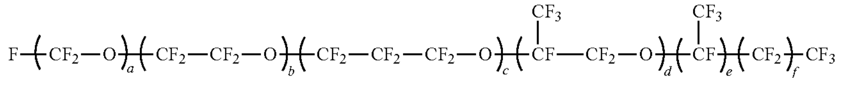

(in the structural formula (2), a, b, c, d, e and f each independently represent 0 or a positive integer, and satisfy 1≤a+b+c+d+e+f≤600; and at least one of a, b, c and d is a positive integer).

[Constitution 3]

The fixing member according to Constitution 2, wherein the perfluoropolyether has at least one structure selected from the group consisting of the following structural formulae (3) to (6):

(3)

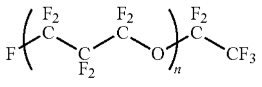

(in the structural formula (3), n represents a positive integer, and n is a number in a range in which the viscosity of the perfluoropolyether at a temperature of 40° C. is in a range of 30 mPa·s to 500 mPa·s);

(4)

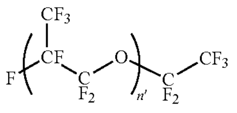

(in the structural formula (4), n' represents a positive integer, and n' is a number in a range in which the viscosity of the perfluoropolyether at a temperature of 40° C. is in a range of 10 mPa·s to 2500 mPa·s);

(5)

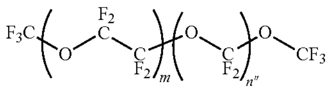

(in the structural formula (5), m and n" each independently represent a positive integer, min" is a number of 0.5 or larger and 2 or smaller, and m+n" is a number in a range in which the viscosity of the perfluoropolyether at a temperature of 40° C. is in a range of 20 mPa·s to 1400 mPa·s); and (6)

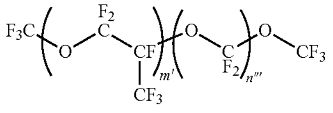

(in the structural formula (6), m' and n'" each independently represent a positive integer, m'/n'" represents a number of 20 or larger and 1000 or smaller, and m'+n'" is a number in a range in which the viscosity of the perfluoropolyether at a temperature of 40° C. is in a range of 20 mPa·s to 1200 mPa·s).

[Constitution 4]

The fixing member according to any one of Constitutions 1 to 3, having an endless belt shape, and a ratio (porosity) of an area occupied by the at least one pore to an area including a portion of the at least one pore, in a cross section along a circumferential direction of the fixing member of the surface layer is 25.0% or more and 60.0% or less.

[Constitution 5]

The fixing member according to any one of Constitutions 1 to 4, wherein the content ratio of the composition in the pore to the total mass of the surface layer including the mass of the composition is 20% by mass or more and 60% by mass or less.

[Constitution 6]

The fixing member according to any one of Constitutions 1 to 5, wherein a content ratio (mass ratio) of the perfluoropolyether in the composition is 0.20 or more and 0.80 or less.

[Constitution 7]

The fixing member according to any one of Constitutions 1 to 6, wherein a viscosity of the perfluoropolyether at 40° C. is 1000 mPa·s or higher and 2500 mPa·s or lower.

[Constitution 8]

The fixing member according to any one of Constitutions 1 to 7, wherein an average opening diameter of the openings on a first surface constituting the outer surface of the surface layer is 1 nm or larger and 5 μm or smaller.

[Constitution 9]

The fixing member according to any one of Constitutions 1 to 8, wherein an opening ratio on the first surface constituting the outer surface of the surface layer is 1.0% or larger and 15.0% or smaller.

[Constitution 10]

The fixing member according to any one of Constitutions 1 to 9, wherein a thickness of the surface layer is 10 μm or larger and 100 μm or smaller.

[Constitution 11]

A method for producing the fixing member according to any one of Constitutions 1 to 10, including the following step (I) to step (V):

step (I): providing a layered product having a base layer and a resin layer containing a tetrafluoroethylene-perfluoroalkyl vinyl ether copolymer (PFA), step (II): bringing a first perfluoropolyether that has been heated to a temperature in the vicinity of a melting point of the PFA into contact with a first surface constituting an outer surface of the resin layer to impregnate the resin layer with the first perfluoropolyether, step (III): cooling to room temperature the layered product obtained in the step (II) in which the resin layer is impregnated with the first perfluoropolyether, step (IV): removing, from the first surface side of the resin layer, at least a part of the first perfluoropolyether impregnated in the resin layer using a fluorine-based solvent to thereby form at least one pore opened on the first surface of the resin layer, in the resin layer, and step (V): allowing at least a part of the at least one pore to contain a mixture containing a second perfluoropolyether and a mixture for forming a fluoropolymer, and curing the mixture for forming the fluoropolymer.

[Constitution 12]

A fixing apparatus including: the fixing member according to any one of Constitutions 1 to 10; and a heating unit for heating the fixing member.

[Constitution 13]

The fixing apparatus according to Constitution 12, wherein the fixing member is a fixing belt having an endless belt shape, and the heating unit is a heater arranged in contact with an inner peripheral surface of the fixing belt.

[Configuration 14]

An electrophotographic image forming apparatus including the fixing apparatus according to Constitution 12 or 13.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A fixing member comprising a base layer and a surface layer, the surface layer containing a tetrafluoroethylene-perfluoroalkyl vinyl ether copolymer, and having at least one pore communicating with an opening on an outer surface thereof, a composition containing perfluoropolyether and a fluoropolymer being contained in at least a part of the at least one pore, wherein the fluoropolymer has a repeating unit represented by the following structural formula (1), and at least one unit selected from the group consisting of a T unit of siloxane and a Q unit of siloxane:

(1)

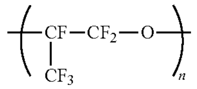

wherein n represents a positive integer, wherein the perfluoropolyether has a structure represented by the following structural formula (2):

(2)

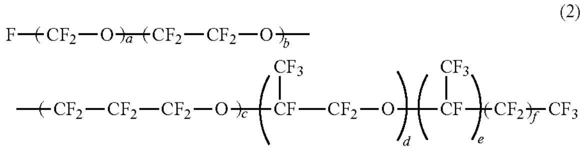

wherein a, b, c, d, e and f each independently represent 0 or a positive integer, and satisfy 1≤a+b+c+d+e+f≤600; and at least one of a, b, c and d is a positive integer.

2. The fixing member according to claim 1, wherein the perfluoropolyether has at least one structure selected from the group consisting of the following structural formulae (3) to (6):

(3)

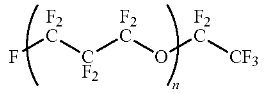

wherein n represents a positive integer, and n is a number in a range in which the viscosity of the perfluoropolyether at a temperature of 40° C. is in a range of 30 mPa·s to 500 mPa·s;

(4)

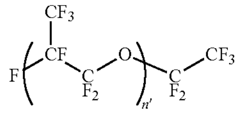

wherein n' represents a positive integer, and n' is a number in a range in which the viscosity of the perfluoropolyether at a temperature of 40° C. is in a range of 10 mPa·s to 2500 mPa·s;

(5)

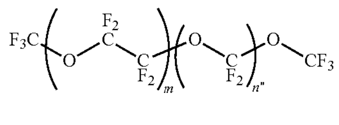

wherein m and n" each independently represent a positive integer, m/n" is a number of 0.5 or larger and 2 or smaller, and m+n" is a number in a range in which the viscosity of the perfluoropolyether at a temperature of 40° C. is in a range of 20 mPa·s to 1400 mPa·s; and (6)

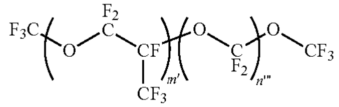

wherein m' and n" each independently represent a positive integer, m'/n" is a number of 20 or larger and 1000 or smaller, and m'+n" is a number in a range in which the viscosity of the perfluoropolyether at a temperature of 40° C. is in a range of 20 mPa·s to 1200 mPa·s.

3. The fixing member according to claim 1, having an endless belt shape, wherein a ratio (porosity) of an area occupied by the at least one pore to an area including a portion of the at least one pore, in a cross section along a circumferential direction of the fixing member of the surface layer is 25.0% or more and 60.0% or less.

4. The fixing member according to claim 1, wherein the content ratio of the composition contained in the at least one pore to the total mass of the surface layer including the mass of the composition is 20% by mass or more and 60% by mass or less.

5. The fixing member according to claim 1, wherein a content ratio (mass ratio) of the perfluoropolyether in the composition is 0.20 or more and 0.80 or less.

6. The fixing member according to claim 1, wherein a viscosity of the perfluoropolyether at 40° C. is 1000 mPa·s or higher and 2500 mPa·s or lower.

7. The fixing member according to claim 1, wherein an average opening diameter of the openings on a first surface constituting the outer surface of the surface layer is 1 nm or larger and 5 μm or smaller.

8. The fixing member according to claim 1, wherein an opening ratio on the first surface constituting the outer surface of the surface layer is 1.0% or larger and 15.0% or smaller.

9. The fixing member according to claim 1, wherein a thickness of the surface layer is 10 μm or larger and 100 μm or smaller.

10. A fixing apparatus comprising: a fixing member comprising a base layer and a surface layer; and a heating unit for heating the fixing member, wherein the surface layer contains a tetrafluoroethylene-perfluoroalkyl vinyl ether copolymer, and having at least one pore communicating with an opening on an outer surface thereof, a composition containing perfluoropolyether and a fluoropolymer is contained in at least a part of the at least one pore, wherein the fluoropolymer has a repeating unit represented by the following structural formula (1), and at least one structure selected from the group consisting of a T unit of siloxane and a Q unit of siloxane:

(1)

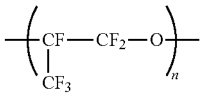

wherein n represents a positive integer, wherein the perfluoropolyether has a structure represented by the following structural formula (2):

(2)

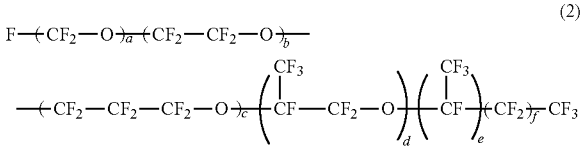

wherein a, b, c, d, e and f each independently represent 0 or a positive integer, and satisfy 1≤a+b+c+d+e+f≤600; and at least one of a, b, c and d is a positive integer.

11. The fixing apparatus according to claim 10, wherein the fixing member is a fixing belt having an endless belt shape, and the heating unit is a heater arranged in contact with an inner peripheral surface of the fixing belt.

12. An electrophotographic image forming apparatus comprising a fixing apparatus comprising: a fixing member comprising a base layer and a surface layer; and a heating unit for heating the fixing member, wherein the surface layer contains a tetrafluoroethylene-perfluoroalkyl vinyl ether copolymer, and having at least one pore communicating with an opening on an outer surface thereof, a composition containing perfluoropolyether and a fluoropolymer is contained in at least a part of the at least one pore, wherein the fluoropolymer has a repeating unit represented by the following structural formula (1), and at least one structure selected from the group consisting of a T unit of siloxane and a Q unit of siloxane:

(1)

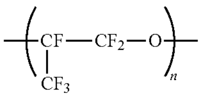

wherein n represents a positive integer, wherein the perfluoropolyether has a structure represented by the following structural formula (2):

(2)

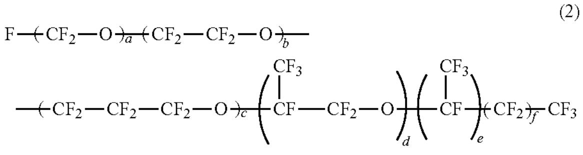

wherein a, b, c, d, e and f each independently represent 0 or a positive integer, and satisfy 1≤a+b+c+d+e+f≤600; and at least one of a, b, c and d is a positive integer.

* * * * *